United States Patent
Lin et al.

(10) Patent No.: US 9,240,184 B1
(45) Date of Patent: Jan. 19, 2016

(54) FRAME-LEVEL COMBINATION OF DEEP NEURAL NETWORK AND GAUSSIAN MIXTURE MODELS

(71) Applicants: Hui Lin, Sunnyvale, CA (US); Xin Lei, Sunnyvale, CA (US); Vincent Vanhoucke, San Francisco, CA (US)

(72) Inventors: Hui Lin, Sunnyvale, CA (US); Xin Lei, Sunnyvale, CA (US); Vincent Vanhoucke, San Francisco, CA (US)

(73) Assignee: Google Inc., Mountain View, CA (US)

( * ) Notice: Subject to any disclaimer, the term of this patent is extended or adjusted under 35 U.S.C. 154(b) by 296 days.

(21) Appl. No.: 13/765,002

(22) Filed: Feb. 12, 2013

Related U.S. Application Data

(60) Provisional application No. 61/726,714, filed on Nov. 15, 2012.

(51) Int. Cl.
*G10L 15/22* (2006.01)
(52) U.S. Cl.
CPC .................................. *G10L 15/22* (2013.01)
(58) Field of Classification Search
CPC ...................... H04N 1/00344; H04N 1/00938; G10L 15/22
USPC ........ 704/232; 358/1.15, 1.16, 400, 402, 474, 358/475, 488, 498; 700/19; 707/736; 709/203, 217, 218, 220, 223, 224, 227, 709/245; 710/15, 19, 8; 719/310, 321, 328
See application file for complete search history.

(56) References Cited

U.S. PATENT DOCUMENTS

| | | | | |
|---|---|---|---|---|
| 5,007,093 | A | * | 4/1991 | Thomson ................ G10L 25/93 704/214 |
| 5,046,100 | A | * | 9/1991 | Thomson ................ G10L 25/93 704/214 |
| 5,193,142 | A | * | 3/1993 | Zhao ...................... G10L 15/144 704/200 |
| 5,502,790 | A | | 3/1996 | Yi |
| 5,509,103 | A | * | 4/1996 | Wang ................... G06K 9/6287 704/232 |
| 5,535,305 | A | | 7/1996 | Acero et al. |
| 5,548,684 | A | | 8/1996 | Wang et al. |
| 5,555,344 | A | | 9/1996 | Zunkler |
| 5,692,100 | A | | 11/1997 | Tsuboka et al. |

(Continued)

OTHER PUBLICATIONS

"An Introduction to Hybrid HMM/Connectionist Continuous Speech Recognition", Nelson Morgan and Herve Bourlard, IEEE Signal Processing Magazine, May 1995.*

(Continued)

*Primary Examiner* — Peter K Huntsinger
*Assistant Examiner* — Edwin S Leland, III
(74) *Attorney, Agent, or Firm* — McDonnell Boehnen Hulbert & Berghoff LLP

(57) ABSTRACT

A method and system for frame-level merging of HMM state predictions determined by different techniques is disclosed. An audio input signal may be transformed into a first and second sequence of feature vector, the sequences corresponding to each other and to a temporal sequence of frames of the audio input signal on a frame-by-frame basis. The first sequence may be processed by a neural network (NN) to determine NN-based state predictions, and the second sequence may be processed by a Gaussian mixture model (GMM) to determine GMM-based state predictions. The NN-based and GMM-based state predictions may be merged as weighted sums for each of a plurality of HMM state on a frame-by-frame basis to determine merged state predictions. The merged state predictions may then be applied to the HMMs to speech content of the audio input signal.

23 Claims, 12 Drawing Sheets

(56) References Cited

U.S. PATENT DOCUMENTS

| | | | |
|---|---|---|---|
| 5,734,793 A * | 3/1998 | Wang | G10L 15/02 704/232 |
| 5,737,486 A | 4/1998 | Iso | |
| 5,745,649 A | 4/1998 | Lubensky | |
| 5,754,681 A * | 5/1998 | Watanabe | G06K 9/6247 382/159 |
| 5,754,978 A * | 5/1998 | Perez-Mendez | G10L 15/32 704/239 |
| 5,794,197 A | 8/1998 | Alleva et al. | |
| 5,839,103 A * | 11/1998 | Mammone | G10L 17/20 704/231 |
| 5,867,816 A | 2/1999 | Nussbaum | |
| 5,930,754 A | 7/1999 | Karaali et al. | |
| 5,937,384 A | 8/1999 | Huang et al. | |
| 6,092,039 A | 7/2000 | Zingher | |
| 6,226,612 B1 * | 5/2001 | Srenger | G10L 15/063 704/240 |
| 6,233,550 B1 | 5/2001 | Gersho et al. | |
| 6,363,289 B1 | 3/2002 | Keeler et al. | |
| 6,366,883 B1 * | 4/2002 | Campbell | G10L 13/07 704/258 |
| 6,456,969 B1 * | 9/2002 | Beyerlein | G06F 17/17 382/190 |
| 6,475,245 B2 | 11/2002 | Gersho et al. | |
| 6,490,555 B1 * | 12/2002 | Yegnanarayanan | G10L 15/144 704/231 |
| 6,526,380 B1 * | 2/2003 | Thelen | G10L 15/32 704/251 |
| 6,671,669 B1 * | 12/2003 | Garudadri | G10L 15/32 704/255 |
| 6,760,699 B1 | 7/2004 | Weerackody et al. | |
| 6,845,357 B2 | 1/2005 | Shetty et al. | |
| 6,898,567 B2 * | 5/2005 | Balasuriya | G10L 15/30 704/231 |
| 6,912,499 B1 * | 6/2005 | Sabourin | G10L 15/187 704/243 |
| 6,963,835 B2 | 11/2005 | Kimball et al. | |
| 6,963,837 B1 | 11/2005 | Finke et al. | |
| 7,228,275 B1 * | 6/2007 | Endo | G10L 15/32 704/231 |
| 7,233,899 B2 | 6/2007 | Fain et al. | |
| 7,467,086 B2 | 12/2008 | Menendez-Pidal et al. | |
| 7,496,512 B2 | 2/2009 | Zhao et al. | |
| 7,574,357 B1 | 8/2009 | Jorgensen et al. | |
| 7,660,774 B2 | 2/2010 | Mukherjee et al. | |
| 7,826,894 B2 | 11/2010 | Musallam et al. | |
| 8,010,358 B2 | 8/2011 | Chen | |
| 8,126,710 B2 | 2/2012 | Gemello et al. | |
| 8,239,195 B2 | 8/2012 | Li et al. | |
| 8,311,827 B2 | 11/2012 | Hernandez et al. | |
| 8,352,245 B1 * | 1/2013 | Lloyd | G10L 15/183 704/9 |
| 2002/0091522 A1 * | 7/2002 | Bi | G10L 15/12 704/246 |
| 2002/0116196 A1 * | 8/2002 | Tran | G06F 1/3203 704/270 |
| 2002/0128834 A1 | 9/2002 | Fain et al. | |
| 2002/0193991 A1 * | 12/2002 | Bennett | G10L 15/32 704/247 |
| 2003/0009334 A1 * | 1/2003 | Printz | G10L 15/285 704/257 |
| 2004/0064315 A1 | 4/2004 | Deisher et al. | |
| 2004/0138885 A1 * | 7/2004 | Lin | G10L 15/32 704/240 |
| 2004/0153319 A1 * | 8/2004 | Yacoub | G10L 15/32 704/240 |
| 2004/0210437 A1 * | 10/2004 | Baker | G10L 15/08 704/251 |
| 2004/0236573 A1 | 11/2004 | Sapeluk | |
| 2005/0065790 A1 * | 3/2005 | Yacoub | G10L 15/32 704/231 |
| 2005/0213810 A1 * | 9/2005 | Sabe | G06K 9/00248 382/159 |
| 2005/0286772 A1 * | 12/2005 | Albertelli | G06K 9/6292 382/224 |
| 2006/0136205 A1 * | 6/2006 | Song | G06K 9/6277 704/243 |
| 2006/0136209 A1 | 6/2006 | Menendez-Pidal et al. | |
| 2006/0143010 A1 * | 6/2006 | Han | G10L 15/08 704/254 |
| 2007/0136059 A1 * | 6/2007 | Gadbois | G10L 15/32 704/246 |
| 2007/0198257 A1 * | 8/2007 | Zhang | G10L 17/20 704/233 |
| 2007/0198261 A1 * | 8/2007 | Chen | G10L 15/32 704/240 |
| 2007/0288242 A1 * | 12/2007 | Spengler | G10L 15/20 704/275 |
| 2008/0059200 A1 | 3/2008 | Puli | |
| 2008/0147391 A1 | 6/2008 | Jeong et al. | |
| 2008/0208577 A1 * | 8/2008 | Jeong | G10L 15/32 704/231 |
| 2008/0249762 A1 * | 10/2008 | Wang | G06F 17/2785 704/9 |
| 2009/0018833 A1 * | 1/2009 | Kozat | G10L 15/32 704/257 |
| 2009/0048843 A1 | 2/2009 | Nitisaroj et al. | |
| 2009/0138265 A1 * | 5/2009 | Willett | G10L 15/30 704/251 |
| 2009/0216528 A1 * | 8/2009 | Gemello | G10L 15/16 704/232 |
| 2009/0319342 A1 * | 12/2009 | Shilman | G06F 17/30864 705/7.41 |
| 2010/0004930 A1 * | 1/2010 | Strope | G10L 15/32 704/240 |
| 2010/0121638 A1 | 5/2010 | Pinson et al. | |
| 2010/0185436 A1 | 7/2010 | Saleh et al. | |
| 2010/0198598 A1 | 8/2010 | Herbig et al. | |
| 2010/0217589 A1 | 8/2010 | Gruhn et al. | |
| 2010/0280827 A1 * | 11/2010 | Mukerjee | G10L 15/142 704/236 |
| 2010/0318358 A1 * | 12/2010 | Onishi | G10L 15/08 704/255 |
| 2010/0332229 A1 * | 12/2010 | Aoyama | G06K 9/00221 704/251 |
| 2011/0040561 A1 * | 2/2011 | Vair | G10L 17/04 704/240 |
| 2011/0224981 A1 * | 9/2011 | Miglietta | G10L 15/26 704/235 |
| 2011/0288855 A1 | 11/2011 | Roy | |
| 2012/0072215 A1 | 3/2012 | Yu et al. | |
| 2012/0076361 A1 * | 3/2012 | Fujiyoshi | G06T 7/004 382/103 |
| 2012/0084086 A1 * | 4/2012 | Gilbert | G10L 15/32 704/235 |
| 2012/0101401 A1 * | 4/2012 | Faul | A61B 5/0476 600/544 |
| 2012/0166194 A1 * | 6/2012 | Jung | G10L 15/02 704/238 |
| 2012/0269441 A1 * | 10/2012 | Marchesotti | G06N 99/005 382/195 |
| 2013/0006991 A1 * | 1/2013 | Nagano | G06F 17/3002 707/737 |
| 2013/0226587 A1 * | 8/2013 | Cheung | G10L 15/25 704/273 |
| 2014/0149104 A1 * | 5/2014 | Kim | G06F 17/289 704/8 |
| 2014/0278390 A1 * | 9/2014 | Kingsbury | G10L 15/1822 704/232 |
| 2014/0358265 A1 * | 12/2014 | Wang | G10H 1/00 700/94 |
| 2015/0058004 A1 * | 2/2015 | Dimitriadis | G10L 15/08 704/233 |

OTHER PUBLICATIONS

N. Morgan and H. Bourlard. "An Introduction to Hybrid HMM/Connectionist Continuous Speech Recognition." IEEE Signal Processing Magazine, pp. 25-42, May 1995.

Gales, M.J.F. "Maximum Likelihood Linear Transformations for HMM-Based Speech Recognition." Technical Document CUED/F-INFENG/TR 291, Cambridge University Engineering Department, May 1995, from ftp://svr-ftp.eng.cam.ac.uk/pub/reports/auto-pdf/gales_tr291.pdf.

(56) References Cited

OTHER PUBLICATIONS

Anastasakos, T.; McDonough, J.; Makhoul, J., "A compact model for speaker-adaptive training." Spoken Language 1966. ICSLP 96. Proceedings., Fourth International Conference on Oct. 3-6, 1996, vol. 2, pp. 1137-1140, from http://www.asel.udel.edu/icslp/cdrom/vol2/764/a764.pdf.

Sim et al. "Stream-based context-sensitive phone mapping for cross-lingual speech recognition." Interspeech 2009, Sep. 2009, pp. 3019-3022.

Sim, Khe Chai. "Discriminative product-of-expert acoustic mapping for cross-lingual phone recognition." Automatic Speech Recognition & Understanding, 2009. ASRU 2009. IEEE Workshop on IEEE, Dec. 2009, pp. 546-551.

Guangsen et al. "Comparison of Smoothing Techniques for Robust Context Dependent Acoustic Modelling in Hybrid NN/HMM Systems." Interspeech 2001, Aug. 2011, pp. 457-460.

Young et al. "Tree-based state tying for high accuracy acoustic modelling." Proceedings of the workshop on Human Language Technology. Association for Computational Linguistics, 1994, pp. 307-312.

Ziegenhain et al. "Triphone tying techniques combining a-priori rules and data driven methods." European Conference on Speech Communication and Technology (EUROSPEECH). vol. 2. 2001, pp. 1-4.

Ming, Ji, and F. Jack Smith. "Improved phone recognition using Bayesian triphone models." Acoustics, Speech and Signal Processing, 1998. Proceedings of the 1998 IEEE International Conference on. vol. 1. IEEE, 1998, pp. 1-4.

Daniel J. Kershaw. "Phonetic Context-Dependency in a Hybrid ANN/HMM Speech Recognition System." St. John's College University of Cambridge. Jan. 28, 1997, pp. i-x, 1-16.

Eide, Ellen, and Gish, Herbert, "A parametric approach to vocal tract length normalization," Acoustics, Speech, and Signal Processing, 1996. ICASSP-96. Conference Proceedings., 1996 IEEE International Conference on May 9, 1996, vol. 1, pp. 346-348, from http://www.ee.columbia.edu/~dpwe/papers/EideG96-vtln.pdf.

Office Action in U.S. Appl. No. 13/560,658 mailed Dec. 12, 2012.

Office Action in U.S. Appl. No. 13/560,706 mailed Nov. 28, 2012.

Notice of Allowance in U.S. Appl. No. 13/560,740 mailed Nov. 7, 2012.

\* cited by examiner

FRAME-LEVEL COMBINATION OF DEEP NEURAL NETWORK AND GAUSSIAN MIXTURE MODELS

CROSS-REFERENCE TO RELATED APPLICATIONS

This application claims priority under 35 U.S.C. §119(e) to U.S. Provisional Patent Application Ser. No. 61/726,714, filed on Nov. 15, 2012, which is incorporated herein in its entirety by reference.

BACKGROUND

Unless otherwise indicated herein, the materials described in this section are not prior art to the claims in this application and are not admitted to be prior art by inclusion in this section.

A goal of automatic speech recognition (ASR) technology is to map a particular utterance to an accurate textual representation, or other symbolic representation, of that utterance. For instance, ASR performed on the utterance "my dog has fleas" would ideally be mapped to the text string "my dog has fleas," rather than the nonsensical text string "my dog has freeze," or the reasonably sensible but inaccurate text string "my bog has trees." Various technologies, including computers, network servers, telephones, and personal digital assistants (PDAs), can be employed to implement an ASR system, or one or more components of such a system. Communication networks may in turn provide communication paths and links between some or all of such devices, supporting ASR capabilities and services that may utilize ASR capabilities.

BRIEF SUMMARY

In one aspect, an example embodiment presented herein provides a method comprising: transforming an audio input signal, using one or more processors of a system, into a first sequence of feature vectors and a second sequence of feature vectors, both the first and second sequences of feature vectors corresponding in common to a sequence of temporal frames of the audio input signal, wherein each respective feature vector of the first sequence and a corresponding respective feature vector of the second sequence bear quantitative measures of acoustic properties of a corresponding, respective temporal frame of the sequence of temporal frames of the audio input signal; processing the first sequence of feature vectors with a neural network (NN) implemented by the one or more processors of the system to generate a NN-based set of emission probabilities for a plurality of hidden Markov models (HMMs) implemented by the one or more processors of the system; processing the second sequence of feature vectors with a Gaussian mixture model (GMM) implemented by the one or more processors of the system to generate a GMM-based set of emission probabilities for the plurality of HMMs; merging the NN-based set of emission probabilities with the GMM-based set of emission probabilities to generate a merged set of emission probabilities for the plurality of HMMs; and applying the merged set of emission probabilities to the plurality of HMMs to determine speech content corresponding to the sequence of temporal frames of the audio input signal.

In another aspect, an example embodiment presented herein provides a method comprising: transforming an audio input signal, using one or more processors of a system, into a first sequence of feature vectors and a second sequence of feature vectors, both the first and second sequences of feature vectors corresponding in common to a sequence of temporal frames of the audio input signal, wherein each respective feature vector of the first sequence and a corresponding respective feature vector of the second sequence bear quantitative measures of acoustic properties of a corresponding, respective temporal frame of the sequence of temporal frames of the audio input signal; processing each respective feature vector of the first sequence with a neural network (NN) implemented by the one or more processors of the system to determine, for each respective state of a multiplicity of states of hidden Markov models (HMMs) implemented by the one or more processors of the system, a respective NN-based conditional probability of emitting the respective feature vector of the first sequence given the respective state; processing each respective feature vector of the second sequence with a Gaussian mixture model (GMM) implemented by the one or more processors of the system to determine, for each respective state of the multiplicity of states, a respective GMM-based conditional probability of emitting the respective feature vector of the second sequence given the respective state; for each pair of a respective feature vector of the first sequence and a corresponding respective feature vector of the second sequence, determining, for each respective state of the multiplicity of states, a respective weighted sum of the respective NN-based conditional probability and the respective GMM-based conditional probability, each respective weighted sum being one of a set of weighted-sum emission probabilities for the multiplicity of states; and adjusting weights of the set of weighted-sum emission probabilities in order to reduce a difference between (i) predicted speech content of the sequence of temporal frames determined by applying the set of weighted-sum emission probabilities to the multiplicity of states and (ii) pre-determined speech content of the sequence of temporal frames.

In still another aspect, an example embodiment presented herein provides a system comprising: one or more processors; memory; and machine-readable instructions stored in the memory, that upon execution by the one or more processors cause the system to carry out operations comprising: transforming an audio input signal into a first sequence of feature vectors and a second sequence of feature vectors, wherein both the first and second sequences of feature vectors correspond in common to a sequence of temporal frames of the audio input signal, and wherein each respective feature vector of the first sequence and a corresponding respective feature vector of the second sequence bear quantitative measures of acoustic properties of a corresponding, respective temporal frame of the sequence of temporal frames of the audio input signal, processing the first sequence of feature vectors with a neural network (NN) implemented by the system to generate a NN-based set of emission probabilities for a plurality of hidden Markov models (HMMs) implemented by the system, processing the second sequence of feature vectors with a Gaussian mixture model (GMM) implemented by the system to generate a GMM-based set of emission probabilities for the plurality of HMMs, merging the NN-based set of emission probabilities with the GMM-based set of emission probabilities to generate a merged set of emission probabilities for the plurality of HMMs, and applying the merged set of emission probabilities to the plurality of HMMs to determine speech content corresponding to the sequence of temporal frames of the audio input signal.

In yet another aspect, an example embodiment presented herein provides an article of manufacture including a computer-readable storage medium, having stored thereon program instructions that, upon execution by one or more processors of a system, cause the system to perform operations comprising: transforming an audio input signal into a first sequence of feature vectors and a second sequence of feature vectors, wherein both the first and second sequences of feature vectors correspond in common to a sequence of temporal frames of the audio input signal, and wherein each respective feature vector of the first sequence and a corresponding respective feature vector of the second sequence bear quantitative measures of acoustic properties of a corresponding, respective temporal frame of the sequence of temporal frames of the audio input signal; processing the first sequence of feature vectors with a neural network (NN) implemented by the system to generate a NN-based set of emission probabilities for a plurality of hidden Markov models (HMMs) implemented by the system; processing the second sequence of feature vectors with a Gaussian mixture model (GMM) implemented by the system to generate a GMM-based set of emission probabilities for the plurality of HMMs merging the NN-based set of emission probabilities with the GMM-based set of emission probabilities to generate a merged set of emission probabilities for the plurality of HMMs; and applying the merged set of emission probabilities to the plurality of HMMs to determine speech content corresponding to the sequence of temporal frames of the audio input signal.

In still one more aspect, an example embodiment presented herein provides an article of manufacture including a computer-readable storage medium, having stored thereon program instructions that, upon execution by one or more processors of a system, cause the system to perform operations comprising: transforming an audio input signal into a first sequence of feature vectors and a second sequence of feature vectors, wherein both the first and second sequences of feature vectors correspond in common to a sequence of temporal frames of the audio input signal, and wherein each respective feature vector of the first sequence and a corresponding respective feature vector of the second sequence bear quantitative measures of acoustic properties of a corresponding, respective temporal frame of the sequence of temporal frames of the audio input signal; processing each respective feature vector of the first sequence with a neural network (NN) implemented by the system to determine, for each respective state of a multiplicity of states of hidden Markov models (HMMs) implemented by the system, a respective NN-based conditional probability of emitting the respective feature vector of the first sequence given the respective state; processing each respective feature vector of the second sequence with a Gaussian mixture model (GMM) implemented by the system to determine, for each respective state of the multiplicity of states, a respective GMM-based conditional probability of emitting the respective feature vector of the second sequence given the respective state; for each pair of a respective feature vector of the first sequence and a corresponding respective feature vector of the second sequence, determining, for each respective state of the multiplicity of states, a respective weighted sum of the respective NN-based conditional probability and the respective GMM-based conditional probability, each respective weighted sum being one of a set of weighted-sum emission probabilities for the multiplicity of states; and adjusting weights of the set of weighted-sum emission probabilities in order to reduce a difference between (i) predicted speech content of the sequence of temporal frames determined by applying the set of weighted-sum emission probabilities to the multiplicity of states and (ii) pre-determined speech content of the sequence of temporal frames.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrative embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

1. Overview

Figure 1:
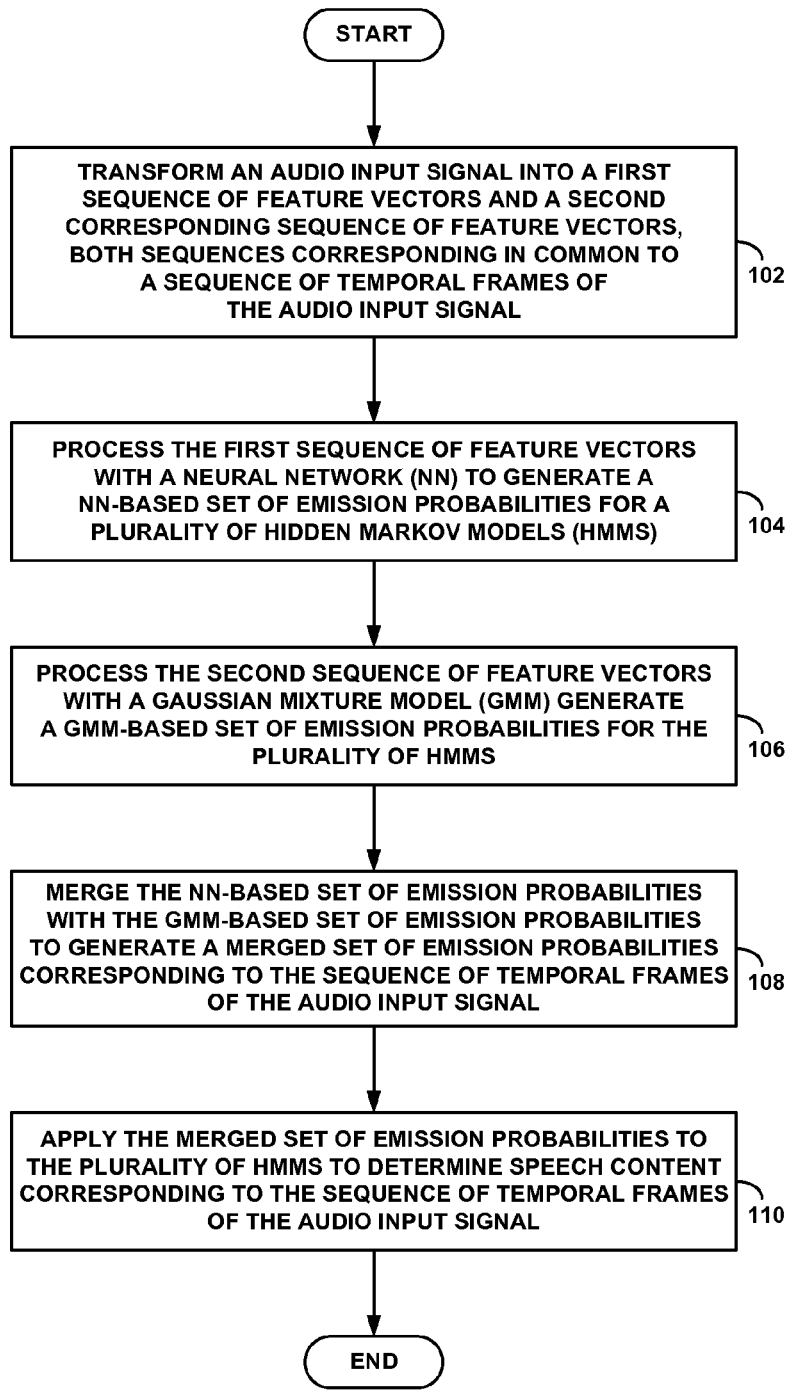
FIG. 1 is a flowchart illustrating an example method in accordance with an example embodiment.

An automatic speech recognition (ASR) system can be a processor-based system configured to recognize a spoken utterance in an audio input signal, and responsively carry out an action associated with, or corresponding to, recognition of the utterance. The spoken utterance could be a word, multiple words, a phrase, multiple phrases, a sentence, multiple sentences, or other segment of speech, for example. The source of the spoken utterance could be a live person speaking in real time into a microphone, telephone, or other audio input/transmission device/system, for example, that then produces and supplies the audio signal as input to the ASR system. The source of the spoken utterance could also be previously-recorded speech that is played out via an audio output device/system, for example, and supplied as the audio input signal to the ASR system. The action associated with, or corresponding to, recognition of the utterance could be translation of the recognized utterance into text, and output and/or recording of the text. The action could also be generation of a response to the recognized utterance, such as synthesis of a reply (e.g., via a voice/sound synthesis device/system), or carrying out a command. Other responses are possible as well.

An ASR system may operate by receiving an input audio signal, processing the audio input signal (e.g., using a digital signal processor) to generate a quantified representation of the signal, and then performing pattern recognition in which the quantified representation of the input signal is matched in some manner against a stored body of similarly quantified representations. The stored body, often referred to as a "corpus," is typically a large collection of speech samples that have been digitally processed, deconstructed, and categorized into a finite set of small, fundamental units of speech sounds, as well as possibly a finite set of larger speech segments (e.g., words, phrases, etc.). The fundamental units may also have associated "tags" or labels that can be used to identify them for purposes of generating text or other output from strings or sequences of units, for example.

By way of example, the small fundamental units could be phonemes. There are, for example, approximately 40 phonemes in spoken English. Spoken words (or other segments of speech) can be constructed from appropriate sequences of subsets of these phonemes. For example, phonemes may occur in particular triplet combinations referred to as "triphones." In a triphone, a given phoneme can appear in the context of a preceding phoneme and a following (subsequent) phoneme. Accordingly, the fundamental units could instead be, or in addition include, triphones. It is also possible to recognize "quinphones" (groups of five phonemes), as well as other grouping sizes.

The phonemes (or other small fundamental speech units) of the corpus can be represented and stored in one or another quantitative form. Accordingly, by processing the audio input signal in short units that can be quantitatively compared with stored phonemes or sequences of the stored phonemes, a matching technique can be employed to identify a likely sequence or sequences of stored phonemes that corresponds to the processed audio input signal. In this way, the spoken utterance in the input audio signal can be recognized as corresponding to a synthesized utterance reconstructed from the corpus of stored speech sounds.

At a high-level, the architecture of an ASR system may include a signal processing component, a pattern classification component, an acoustic model component, a language model component, and a dictionary component (among other possible components). The signal processing component receives the audio input signal, digitally samples it within a sequence of time frames, and processes the frame samples to generate a corresponding sequence of "feature vectors." Each feature vector includes a set of measured and/or derived elements that characterize the acoustic content of the corresponding time frame. This process is sometimes referred to as "feature extraction." The acoustic content represented in a feature vector can correspond to some portion of one or more fundamental speech units (e.g., phoneme, triphone, etc.), and thus can be used for matching against the speech units of the corpus.

The pattern classification component receives a sequence of feature vectors as input, and can apply the acoustic model, language model, and dictionary in order to carry out the recognition process. The acoustic model can access the corpus and can implement the search/comparison process to determine optimal sequences of phonemes, triphones, or other fundamental speech units. The language model includes rules of the spoken language (e.g., grammar, syntax, etc.) that can be applied to help guide and/or constrain the recognition process, while the dictionary component may provide semantic constraints at the word level. The corpus may also include identifications or "labels" of its contents, so that the synthesized utterances reconstructed from the corpus of stored speech sounds can be rendered in text or other formats suitable for enabling the ASR system to generate a response (or responses) to recognition of spoken utterances. The output of the pattern classification component is the recognized speech carried in the utterance. The form of the output could be a text string or an action corresponding to the recognized speech, for example.

Among various approaches for implementing the acoustic model, the "hidden Markov model" (HMM) approach is well suited for the probabilistic nature of speech recognition. In a HMM approach, phonemes, triphones, or other fundamental speech units are modeled probabilistically as respective groupings of HMM states. More specifically, each fundamental speech unit is seen as temporally evolving according to some sequence of temporal phases of the speech unit. It has been observed empirically, for example, that phonemes manifest in speech across three acoustic phases: a start, a middle, and an end. A given phoneme (or other fundamental speech unit) therefore can be reasonably modeled with three states, one corresponding to each acoustic phase. Transitions between states are governed by transition probabilities of the model. In addition, each state has an associated "emission probability" for "emitting" an output corresponding to the acoustic phase of the phoneme. For purposes of the discussion herein, the three HMM states described as modeling a given phoneme (or other fundamental speech unit) will be referred to collectively simply as "a HMM for the given phoneme." Thus, a HMM for a given phoneme (or other fundamental speech unit) will be understood as being characterized by probabilities of transitioning from a current state to a next state, and upon transitioning, a respective probability of producing (emitting) the acoustic phase associated with the next state. It will be appreciated that a HMM for modeling a fundamental speech unit is not necessarily limited to three states, and that HMMs with greater than or fewer than three states are possible.

Sequential feature vectors derived from an audio input stream represent a stream of observed acoustic data, while sequential states of one or more HMMs may be concatenated to represent probable sequences of phonemes, triphones, or other fundamental speech units in the corpus that correspond to the observed acoustic data. The term "concatenated HMMs" will be used to refer to a concatenation of respective groupings of HMM states, where each respective grouping models a fundamental speech unit (as defined above). The states and models are "hidden" in the sense that, while the possible states and their associated transition and emission probabilities may be known, the specific state sequences associated with any given observed sequence of feature vectors is not a priori known. Recognition of utterances (speech) in the audio input signal therefore can be thought of as determining the most probable sequence (or sequences) of states of one or more concatenated HMMs that would produce the observed feature vectors. The most probable sequence of states then corresponds to the most probable sequence of phonemes, triphones, or other fundamental speech units in the corpus, from which the input utterance can be reconstructed and thereby recognized.

In HMM operation, the determination of the most probable sequences of HMMs and states is carried out one step at a time, with each time step corresponding to the frame of observed data in the input stream as represented quantitatively in a next feature vector. More specifically, at each time step the most likely next HMM state from among a multiplicity of possible HMM states may be determined by computing for each respective state of the multiplicity a conditional probability of observing the data represented in the feature vector at that time step, given the respective state. In the parlance of HMMs, the observable output of a given state is said to be "emitted." The conditional probabilities are the emission probabilities referred to above. Thus, in order to model an observed sequence of feature vectors as a sequence of acoustic states of a multiplicity of HMMs, emission probabilities for each feature vector of the sequence need to be determined.

Two suitable computational techniques for determining emission probabilities of feature vectors are Gaussian mixture models (GMMs) and neural networks (NNs). The GMM technique can be thought of as an empirical-statistical classification of the set of quantitative measures included in feature vectors, as derived from a (typically large) sample of observations. More specifically, by treating each type of measured quantity (i.e., feature) of feature vectors as an observational variable, multiple observations over many feature vectors during a training procedure can be used to derive statistical frequencies and related frequency distribution functions for each observational variable, and for a variety of observed feature vectors.

For a given common set of defining features, different feature vectors derived from frames of similar acoustic data may tend to include the features of the defining set in similar proportion. For example, similar frames of acoustic data could correspond to a particular fundamental speech unit, such as phoneme or triphone, produced by a range of different sources (e.g., different speakers) and in a range of different contexts (e.g., in different utterances). Repeated observations of the particular fundamental speech unit over the range of sources and contexts may be used during training to map out the observed frequency distribution functions of the defining features as they occur on "average" for the particular fundamental speech unit. Thus, a particular fundamental speech unit can be thought of as being characterized by a mix of frequency distributions, each frequency distribution characterizing an average or expected contribution of a particular defining feature.

By making repeated training observations over a wide range of sample speech (and a corresponding wide range of fundamental speech units), a body of fundamental speech units can come to be represented by a variety of "average" mixtures of distribution functions, each distribution function associated with an observational variable (i.e., a feature). It has been found empirically that the observed distribution functions can be well-represented as Gaussians. Accordingly, fundamental speech units can be modeled as mixtures of Gaussian distributions of defining features, hence the name "Gaussian mixture model." In practice, the different speech units to which the different Gaussian mixtures apply may not necessarily be individual phonemes or triphones, but rather empirically-derived clusters of speech units having one or more shared or similar characteristics. During training operation, the parameters of the Gaussians in the various mixtures may be adjusted in an effort to optimize agreement between the models and the known (training) data.

During run-time operation, observed feature vectors derived from an input audio signal can be compared against the GMM distributions in order to determine the conditional probabilities (i.e., emission probabilities) that any state would emit the feature vectors. The emission probabilities may then be applied for each feature vector at each time step to predict the most likely next state.

In the neural network technique, a neural network functions to generate the emission probabilities for all of the states that need to be considered at each step. The input to the neural network is one or more feature vectors, where a sequence of multiple feature vectors can provide additional context for processing by the neural network of a given feature vector of the sequence. During training operation, the neural network is trained to recognize a wide variety of feature vectors, and to associate or identify them with a wide variety of fundamental speech units over a range of sources and contexts. As with the GMM approach, the speech units used during training may not necessarily be individual phonemes or triphones, but rather empirically-derived clusters of speech units having one or more shared or similar characteristics.

During run-time operation, the trained NN recognizes (within the limits of its training, for example) the observed feature vectors derived from an input audio signal, and determines the conditional probabilities (i.e., emission probabilities) that any state would emit the feature vectors. The emission probabilities may then be applied for each feature vector at each time step to predict the most likely next state.

Both the NN technique and the GMM technique have relative advantages and disadvantages in their respective functions of generating emission probabilities. The NN technique can be well-suited to training with large amounts of sample data, and to handling data that may include high degrees of correlation. On a practical level, NN implementations may tend to require significant computing resources, both in terms of memory (or storage) and processing power. The GMM technique can be less computationally complex and resource-intensive than the NN approach, but may need to incorporate some simplifying assumptions to accommodate correlations in the data. In addition to practical trade-offs between the two techniques, each one may tend to yield better or more accurate results than the other for certain fundamental speech units (e.g., phonemes or triphones). In this sense, the two approaches can be considered complementary. Accordingly, there is a need to be able to merge aspects of both techniques to derive the relative advantages of each.

In example embodiments, emission probabilities determined by both a neural network and a GMM are merged at the frame level, and the merged emission probabilities are applied to HMM states. More particularly, an audio input signal is processed to generate a first sequence feature vectors that is input to a neural network, and another corresponding second sequence that is input to a GMM. Each respective feature vector of the first sequence has a corresponding respective feature vector in the second sequence (and vice versa), and each pair of corresponding feature vectors from the first and second sequences correspond in common to temporal frame of the audio input signal.

The neural network generates a plurality of NN-based emission probabilities for each feature vector of the first sequence, where each NN-based emission probability of the plurality is a conditional probability of emitting the feature vector of the first sequence, given a respective state of a corresponding plurality of HMM states. Similarly, GMM is used to generate a plurality of GMM-based emission probabilities for each feature vector of the second sequence, where each GMM-based emission probability of the plurality is a conditional probability of emitting the feature vector of the second sequence, given a respective state of the corresponding plurality of HMM states. On a frame-by-frame basis, a weighted sum of the NN-based and GMM-based emission probabilities for each HMM state is computed. The resulting plurality of weighted-sum emission probabilities then corresponds to a frame-level merging of the NN-based and GMM-based emission probabilities.

In example embodiments, the weights used in the weighted sums may be adjusted during a training procedure. More particularly, training with sample data may be used to adjust the weights so as to yield results that are as close as possible (or above a threshold level of accuracy) to the known data.

2. Example Method

In example embodiments, an ASR system may include one or more processors, one or more forms of memory, one or more input devices/interfaces, one or more output devices/interfaces, and machine-readable instructions that when executed by the one or more processors cause the ASR system to carry out the various functions and tasks described herein. In particular, the functions and tasks may form a basis for a method for frame-level merging of NN-based and GMM-based emission probabilities. An example of such a method is described in the current section.

FIG. 1 is a flowchart illustrating an example method in accordance with an example embodiment. At step 102 the system transforms an audio input signal into a first sequence of feature vectors and a second sequence of feature vectors, where both the first and second sequences of feature vectors correspond in common to a sequence of temporal frames of the audio input signal. More specifically, each respective feature vector of the first sequence has a corresponding respective feature vector in the second sequence, and each pair of corresponding feature vectors of the first and second sequences correspond in common to a respective temporal frame of the sequence of temporal frames of the audio input signal. Further, each corresponding feature vector of the first and second sequences bears quantitative measures of acoustic properties of the corresponding temporal frame. Each temporal frame could contain a portion of the audio input signal digitally sampled within a sliding time window. Each feature vector could include quantitative measures of acoustic properties of the digitally sampled signal within the corresponding time frame.

By way of example, the feature vectors could include Mel Filter Cepstral (MFC) coefficients, as described below. Other possible types of quantitative measures of acoustic properties could include Perceptual Linear Predictive (PLP) coefficients, Relative Spectral (RASTA) coefficients, and Filterbank log-energy coefficients. Techniques for determining these types of quantitative measures from sampled speech are generally known. It will be appreciated that feature vectors may not necessarily be restricted to including only one of these (or other) types of quantitative measures, but could also include more than one type.

In accordance with example embodiments, first and second sequences of feature vectors could be duplicates of each other. That is each corresponding feature vector of the first and second sequences could be a copy of one another. Alternatively, the feature vectors of the first sequence could bear different features than the feature vectors of the second sequence. By way of example, feature vectors of the first sequence could include PLP coefficients, while the feature vectors of the second sequence could include MFC coefficients. Other arrangements are possible as well.

At step 104, a neural network (NN) processes the first sequence of feature vectors to generate a NN-based set of emission probabilities for a plurality of hidden Markov models (HMMs). More particularly, the NN-based set emission probabilities could be associated with HMMs used to model speech units of the system. Each NN-based emission probability could be associated with a state of a HMM used to model a given one (or a given cluster of similar and/or related) of the speech units; and each state of the HMM could correspond to an acoustic phase of the given one (or a given cluster of similar and/or related) of the speech units.

At step 106, a Gaussian mixture model (GMM) processes the second sequence of feature vectors to generate a GMM-based set of emission probabilities for the plurality of hidden HMMs. As with the NN-based emission probabilities, the GMM-based set emission probabilities could be associated with HMMs used to model speech units of the system. Each NN-based emission probability could be associated with a HMM state used to model a given one (or a given cluster of similar and/or related) of the speech units.

A determination of which defining types of features to include in the feature vectors of each of the first and second sequences could be based on which type of subsequent processing is used to determine emission probabilities (e.g., step 104 or step 106), for example. More particularly, one given set defining feature types (e.g., PLP coefficients) might tend to yield more accurate or better quality results when processed by a neural network (step 104), and thus could be used in the first sequence. Similarly, another set of defining feature types (e.g., MFC coefficients) might tend to yield more accurate or better quality results when processed by a GMM (step 106), and thus could be used in the second sequence. As noted, the respective sets of defining feature types best suited for each of the first and second sequences could be the same or different.

At step 108, the GMM-based emission probabilities and the GMM-based emission probabilities are merged to generate a merged set of emission probabilities for the plurality of HMMs. As described below, merging the GMM-based emission probabilities and the GMM-based emission probabilities could correspond to computing weighted sums of the two types of emission probabilities.

Finally, at step 110, the merged set of emission probabilities are applied to the plurality of HMMs in order to determine speech content corresponding to the sequence of temporal frames of the audio input signal.

While the example method employs a neural network (NN), a Gaussian mixture model (GMM), and HMMs, it will be appreciated that the NN, GMM, and the HMMs could themselves be implemented in more than one way, and by more than one configuration of processing devices and/or platforms. For example, the NN could be implemented by a first group of one or more processors, the GMM could be implemented by a second group of one or more processors, and the HMMs could be implemented by a third group of one or more processors. Moreover, the first, second, and third groups could be the same or different, or any two or more of the first, second, and third groups could include one or more common processors. In addition, the algorithmic implementations of the NN, GMMs, and/or the HMMs could be considered part of the example method, or could be ancillary to it, being provided as separate algorithmic components, for example.

In accordance with example embodiments, each of the HMMs in the plurality could be associated with a respective elemental speech unit, and could have one or more states corresponding to one or more temporal phases of the associated, respective elemental speech unit. Thus, the plurality of HMMs could collectively correspond to a multiplicity of states. By way of example, each elemental speech unit could be a phoneme, a triphone, or a quinphone.

In further accordance with example embodiments, the NN-based set of emission probabilities for the plurality of the HMMs could be generated (at step 104) by determining NN-based conditional probabilities for each respective feature vector of the first sequence. More specifically, for each respective state of the multiplicity of states, a respective NN-based conditional probability of emitting the respective feature vector of the first sequence, given the respective state, could be determined. Similarly, the GMM-based set of emission probabilities for the plurality of the HMMs could be generated (at step 106) by determining GMM-based conditional probabilities for each respective feature vector of the second sequence. More specifically, for each respective state of the multiplicity of states, a respective GMM-based conditional probability of emitting the respective feature vector of the second sequence, given the respective state, could be determined.

In accordance with example embodiments, merging (at step 108) the NN-based set of emission probabilities with the GMM-based set of emission probabilities to generate the merged set of emission probabilities could correspond to merging, on a frame-by-frame basis, the NN-based and GMM-based emission probabilities associated with each pair corresponding feature vectors of the first and second sequences. More specifically, for each respective state of the multiplicity, a weighted sum of the respective NN-based conditional probability and the respective GMM-based conditional probability could be determined on a frame-by-frame basis.

In further accordance with example embodiments, determining (at step 110) the speech content corresponding to the sequence of temporal frames of the audio input signal could correspond to determining a probable sequence of elemental speech units based on a most likely sequence of states of the multiplicity. In addition, determining speech content could correspond to generating a text string of the speech content, or identifying a computer-executable command based on the speech content. Other actions associated with determining speech content are possible as well.

In accordance with example embodiments, the weighted sums corresponding to the merged emission probabilities could include adjustable weights. Further, the weights could be adjusted during a training procedure, using audio input signals of known (predetermined) content and correspondingly known (predetermined) textual translations. More specifically, during training time, a training-time audio input signal could be transformed into a first sequence of feature vectors and a second sequence of feature vectors, where both the first and second sequences of feature vectors correspond in common to a sequence of temporal frames of the training-time audio input signal.

As described above, each respective feature vector of the first sequence could be processed with the NN to determine, for each respective state of the multiplicity HMM states, a respective NN-based conditional probability of emitting the respective feature vector of the first sequence, given the respective state. As similarly described, each respective feature vector of the second sequence could be processed with the GMM to determine, for each respective state of the multiplicity HMM states, a respective GMM-based conditional probability of emitting the respective feature vector of the first sequence, given the respective state.

Then, for each pair of a respective feature vector of the first sequence and a corresponding respective feature vector of the second sequence, a respective weighted sum of the respective NN-based conditional probability and the respective GMM-based conditional probability could be determined for each respective state. Each respective weighted sum could then be one of a set of weighted-sum emission probabilities for the multiplicity of states.

The weights could be adjusted iteratively during a training procedure. More specifically, the weighted-sum emission probabilities could be applied to the HMM states to determine predicted speech content of the training-time audio input signal. The predicted speech content could be compared with pre-determined speech content of the training-time audio input signal. The weights of the set of weighted-sum emission probabilities could then be adjusted so as to reduce a difference between the predicted speech content and the pre-determined speech content. For example, the difference between predicted speech content and the pre-determined speech content could be used to derive an error signal or a "penalty function." The steps of adjusting the weights, merging the NN-based and GMM-based emission probabilities, and determining the penalty function could be repeated in an iterative loop until the penalty function (or error signal) was reduced below a threshold, for example. At this point, the weights could be considered to be optimally (or acceptably) adjusted, and their respective, adjusted values used during run-time operation.

It will be appreciated that the steps shown in FIG. 1 are meant to illustrate a method in accordance with an example embodiment. As such, various steps could be altered or modified, the ordering of certain steps could be changed, and additional steps could be added, while still achieving the overall desired operation.

3. Example Communication System and Device Architecture

Methods in accordance with an example embodiment, such as the on described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

a. Example Communication System

Figure 2:
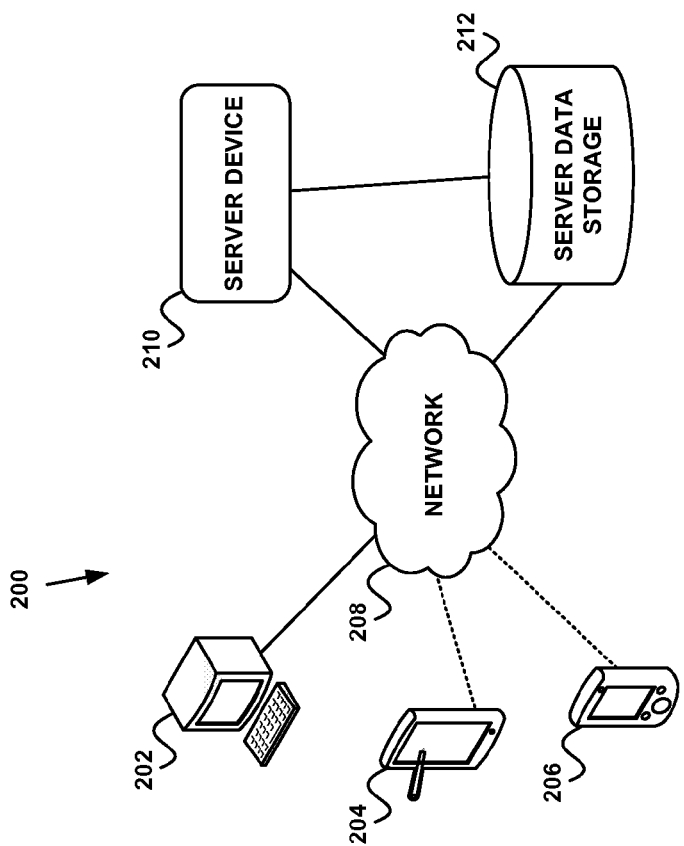
FIG. 2 is a block diagram of an example network and computing architecture, in accordance with an example embodiment.

FIG. 2 is a simplified block diagram of a communication system 200, in which various embodiments described herein can be employed. Communication system 200 includes client devices 202, 204, and 206, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 208 through the use of wireline connections (designated by solid lines) and/or wireless connections (designated by dashed lines).

Network 208 may be, for example, the Internet, or some other form of public or private Internet Protocol (IP) network. Thus, client devices 202, 204, and 206 may communicate using packet-switching technologies. Nonetheless, network 208 may also incorporate at least some circuit-switching technologies, and client devices 202, 204, and 206 may communicate via circuit switching alternatively or in addition to packet switching.

A server device 210 may also communicate via network 208. In particular, server device 210 may communicate with client devices 202, 204, and 206 according to one or more network protocols and/or application-level protocols to facilitate the use of network-based or cloud-based computing on these client devices. Server device 210 may include integrated data storage (e.g., memory, disk drives, etc.) and may also be able to access a separate server data storage 212. Communication between server device 210 and server data storage 212 may be direct, via network 208, or both direct and via network 208 as illustrated in FIG. 2. Server data storage 212 may store application data that is used to facilitate the operations of applications performed by client devices 202, 204, and 206 and server device 210.

Although only three client devices, one server device, and one server data storage are shown in FIG. 2, communication system 200 may include any number of each of these components. For instance, communication system 200 may comprise millions of client devices, thousands of server devices and/or thousands of server data storages. Furthermore, client devices may take on forms other than those in FIG. 2.

b. Example Server Device and Server System

Figure 3A:
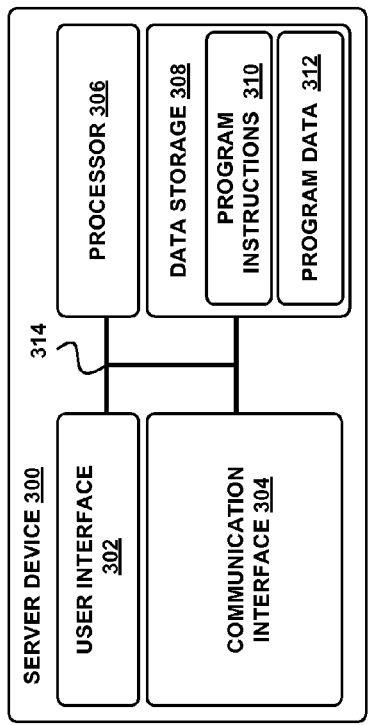
FIG. 3A is a block diagram of a server device, in accordance with an example embodiment.

FIG. 3A is a block diagram of a server device in accordance with an example embodiment. In particular, server device 300 shown in FIG. 3A can be configured to perform one or more functions of server device 210 and/or server data storage 212. Server device 300 may include a user interface 302, a communication interface 304, processor 306, and data storage 308, all of which may be linked together via a system bus, network, or other connection mechanism 314.

User interface 302 may comprise user input devices such as a keyboard, a keypad, a touch screen, a computer mouse, a track ball, a joystick, and/or other similar devices, now known or later developed. User interface 302 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 302 may be configured to generate audible output(s), via a speaker, speaker jack, audio output port, audio output device, earphones, and/or other similar devices, now known or later developed. In some embodiments, user interface 302 may include software, circuitry, or another form of logic that can transmit data to and/or receive data from external user input/output devices.

Communication interface 304 may include one or more wireless interfaces and/or wireline interfaces that are configurable to communicate via a network, such as network 208 shown in FIG. 2. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 304 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 306 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 306 may be configured to execute computer-readable program instructions 310 that are contained in data storage 308, and/or other instructions, to carry out various functions described herein.

Data storage 308 may include one or more non-transitory computer-readable storage media that can be read or accessed by processor 306. The one or more computer-readable storage media may include volatile and/or non-volatile storage components, such as optical, magnetic, organic or other memory or disc storage, which can be integrated in whole or in part with processor 306. In some embodiments, data storage 308 may be implemented using a single physical device (e.g., one optical, magnetic, organic or other memory or disc storage unit), while in other embodiments, data storage 308 may be implemented using two or more physical devices.

Data storage 308 may also include program data 312 that can be used by processor 306 to carry out functions described herein. In some embodiments, data storage 308 may include, or have access to, additional data storage components or devices (e.g., cluster data storages described below).

Referring again briefly to FIG. 2, server device 210 and server data storage device 212 may store applications and application data at one or more locales accessible via network 208. These locales may be data centers containing numerous servers and storage devices. The exact physical location, connectivity, and configuration of server device 210 and server data storage device 212 may be unknown and/or unimportant to client devices. Accordingly, server device 210 and server data storage device 212 may be referred to as "cloud-based" devices that are housed at various remote locations. One possible advantage of such "cloud-based" computing is to offload processing and data storage from client devices, thereby simplifying the design and requirements of these client devices.

In some embodiments, server device 210 and server data storage device 212 may be a single computing device residing in a single data center. In other embodiments, server device 210 and server data storage device 212 may include multiple computing devices in a data center, or even multiple computing devices in multiple data centers, where the data centers are located in diverse geographic locations. For example, FIG. 2 depicts each of server device 210 and server data storage device 212 potentially residing in a different physical location.

Figure 3B:
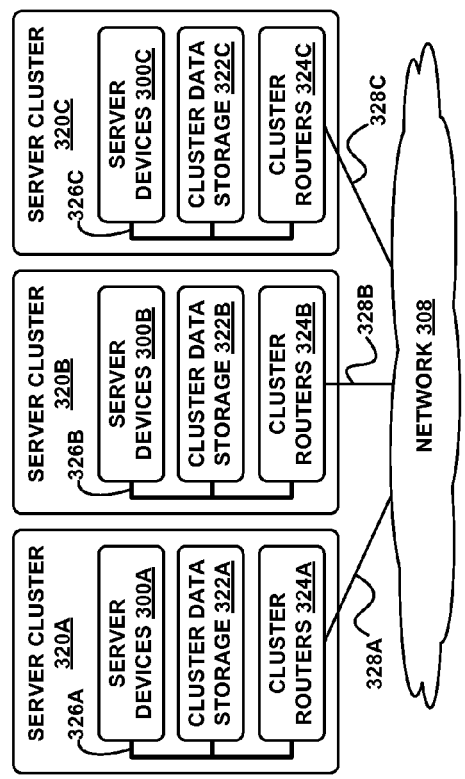
FIG. 3B depicts a cloud-based server system, in accordance with an example embodiment.

FIG. 3B depicts an example of a cloud-based server cluster. In FIG. 3B, functions of server device 210 and server data storage device 212 may be distributed among three server clusters 320A, 320B, and 320C. Server cluster 320A may include one or more server devices 300A, cluster data storage 322A, and cluster routers 324A connected by a local cluster network 326A. Similarly, server cluster 320B may include one or more server devices 300B, cluster data storage 322B, and cluster routers 324B connected by a local cluster network 326B. Likewise, server cluster 320C may include one or more server devices 300C, cluster data storage 322C, and cluster routers 324C connected by a local cluster network 326C. Server clusters 320A, 320B, and 320C may communicate with network 308 via communication links 328A, 328B, and 328C, respectively.

In some embodiments, each of the server clusters 320A, 320B, and 320C may have an equal number of server devices, an equal number of cluster data storages, and an equal number of cluster routers. In other embodiments, however, some or all of the server clusters 320A, 320B, and 320C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 320A, for example, server devices 300A can be configured to perform various computing tasks of a server, such as server device 210. In one embodiment, these computing tasks can be distributed among one or more of server devices 300A. Server devices 300B and 300C in server clusters 320B and 320C may be configured the same or similarly to server devices 300A in server cluster 320A. On the other hand, in some embodiments, server devices 300A, 300B, and 300C each may be configured to perform different functions. For example, server devices 300A may be configured to perform one or more functions of server device 210, and server devices 300B and server device 300C may be configured to perform functions of one or more other server devices. Similarly, the functions of server data storage device 212 can be dedicated to a single server cluster, or spread across multiple server clusters.

Cluster data storages 322A, 322B, and 322C of the server clusters 320A, 320B, and 320C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 210 and server data storage device 212 can be distributed across server clusters 320A, 320B, and 320C, various active portions and/or backup/redundant portions of these components can be distributed across cluster data storages 322A, 322B, and 322C. For example, some cluster data storages 322A, 322B, and 322C may be configured to store backup versions of data stored in other cluster data storages 322A, 322B, and 322C.

Cluster routers 324A, 324B, and 324C in server clusters 320A, 320B, and 320C, respectively, may include networking equipment configured to provide internal and external communications for the server clusters. For example, cluster routers 324A in server cluster 320A may include one or more packet-switching and/or routing devices configured to provide (i) network communications between server devices 300A and cluster data storage 322A via cluster network 326A, and/or (ii) network communications between the server cluster 320A and other devices via communication link 328A to network 308. Cluster routers 324B and 324C may include network equipment similar to cluster routers 324A, and cluster routers 324B and 324C may perform networking functions for server clusters 320B and 320C that cluster routers 324A perform for server cluster 320A.

Additionally, the configuration of cluster routers 324A, 324B, and 324C can be based at least in part on the data communication requirements of the server devices and cluster storage arrays, the data communications capabilities of the network equipment in the cluster routers 324A, 324B, and 324C, the latency and throughput of the local cluster networks 326A, 326B, 326C, the latency, throughput, and cost of the wide area network connections 328A, 328B, and 328C, and/or other factors that may contribute to the cost, speed, fault-tolerance, resiliency, efficiency and/or other design goals of the system architecture.

c. Example Client Device

Figure 4:
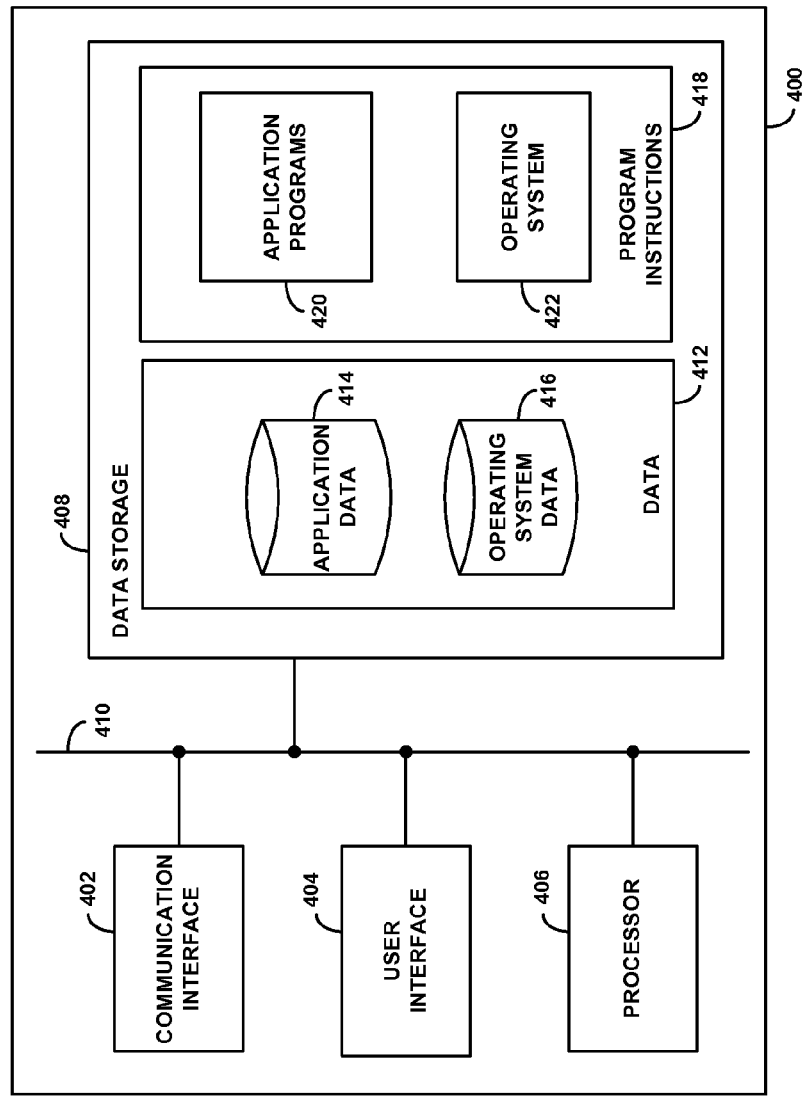
FIG. 4 depicts a block diagram of a client device, in accordance with an example embodiment.

FIG. 4 is a simplified block diagram showing some of the components of an example client device 400. By way of example and without limitation, client device 400 may be or include a "plain old telephone system" (POTS) telephone, a cellular mobile telephone, a still camera, a video camera, a fax machine, an answering machine, a computer (such as a desktop, notebook, or tablet computer), a personal digital assistant (PDA), a wearable computing device, a home automation component, a digital video recorder (DVR), a digital TV, a remote control, or some other type of device equipped with one or more wireless or wired communication interfaces.

As shown in FIG. 4, client device 400 may include a communication interface 402, a user interface 404, a processor 406, and data storage 408, all of which may be communicatively linked together by a system bus, network, or other connection mechanism 410.

Communication interface 402 functions to allow client device 400 to communicate, using analog or digital modulation, with other devices, access networks, and/or transport networks. Thus, communication interface 402 may facilitate circuit-switched and/or packet-switched communication, such as POTS communication and/or IP or other packetized communication. For instance, communication interface 402 may include a chipset and antenna arranged for wireless communication with a radio access network or an access point. Also, communication interface 402 may take the form of a wireline interface, such as an Ethernet, Token Ring, or USB port. Communication interface 402 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

User interface 404 may function to allow client device 400 to interact with a human or non-human user, such as to receive input from a user and to provide output to the user. Thus, user interface 404 may include input components such as a keypad, keyboard, touch-sensitive or presence-sensitive panel, computer mouse, trackball, joystick, microphone, still camera and/or video camera. User interface 404 may also include one or more output components such as a display screen (which, for example, may be combined with a touch-sensitive panel), CRT, LCD, LED, a display using DLP technology, printer, light bulb, and/or other similar devices, now known or later developed. User interface 404 may also be configured to generate audible output(s), via a speaker, speaker jack, audio output port, audio output device, earphones, and/or other similar devices, now known or later developed. In some embodiments, user interface 404 may include software, circuitry, or another form of logic that can transmit data to and/or receive data from external user input/output devices. Additionally or alternatively, client device 400 may support remote access from another device, via communication interface 402 or via another physical interface (not shown).

Processor 406 may comprise one or more general purpose processors (e.g., microprocessors) and/or one or more special purpose processors (e.g., DSPs, GPUs, FPUs, network processors, or ASICs). Data storage 408 may include one or more volatile and/or non-volatile storage components, such as magnetic, optical, flash, or organic storage, and may be integrated in whole or in part with processor 406. Data storage 408 may include removable and/or non-removable components.

In general, processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by client device 400, cause client device 400 to carry out any of the methods, processes, or functions disclosed in this specification and/or the accompanying drawings. The execution of program instructions 418 by processor 406 may result in processor 406 using data 412.

By way of example, program instructions 418 may include an operating system 422 (e.g., an operating system kernel, device driver(s), and/or other modules) and one or more application programs 420 (e.g., address book, email, web browsing, social networking, and/or gaming applications) installed on client device 400. Similarly, data 412 may include operating system data 416 and application data 414. Operating system data 416 may be accessible primarily to operating system 422, and application data 414 may be accessible primarily to one or more of application programs 420. Application data 414 may be arranged in a file system that is visible to or hidden from a user of client device 400.

Application programs 420 may communicate with operating system 412 through one or more application programming interfaces (APIs). These APIs may facilitate, for instance, application programs 420 reading and/or writing application data 414, transmitting or receiving information via communication interface 402, receiving or displaying information on user interface 404, and so on.

In some vernaculars, application programs 420 may be referred to as "apps" for short. Additionally, application programs 420 may be downloadable to client device 400 through one or more online application stores or application markets. However, application programs can also be installed on client device 400 in other ways, such as via a web browser or through a physical interface (e.g., a USB port) on client device 400.

4. Example System and Operation a. Example Automatic Speech Recognition System

Figure 5:
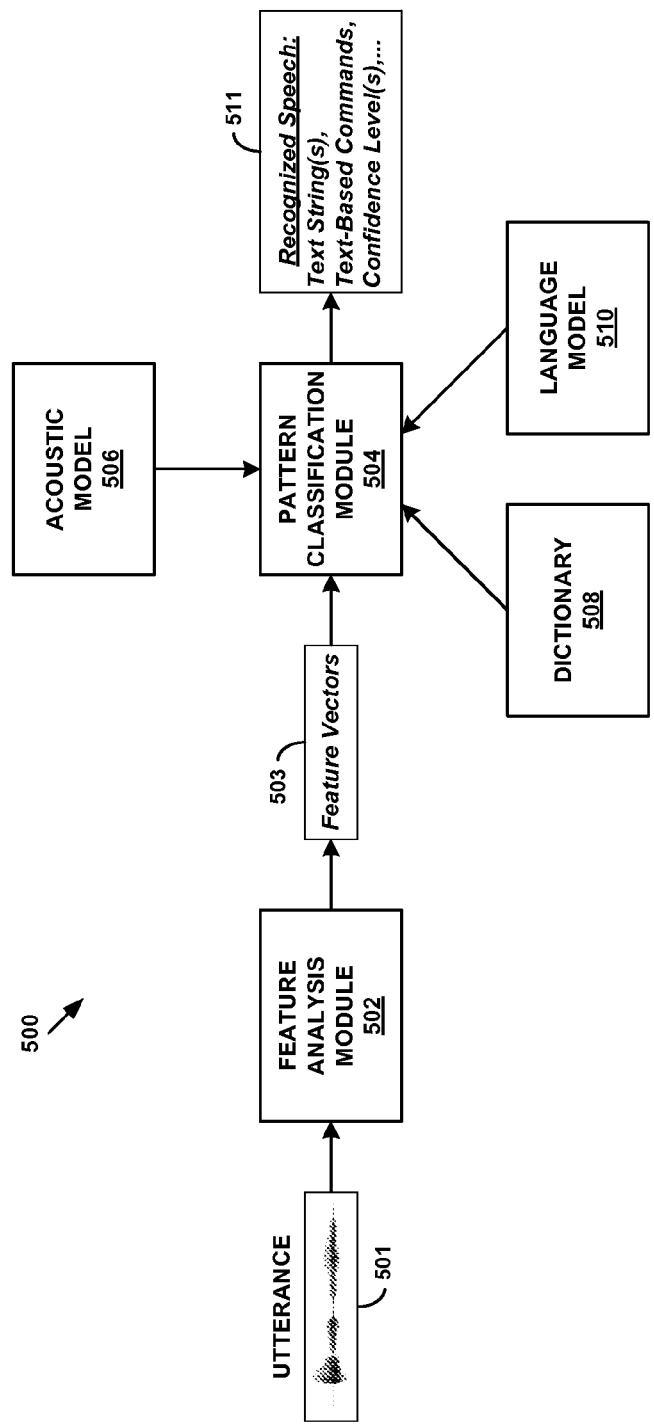
FIG. 5 depicts a block diagram of an ASR system, in accordance with an example embodiment.

FIG. 5 depicts a block diagram of an example ASR system 500 in which an example embodiment of frame-level merging of NN-based and GMM-based emission probabilities could be carried out. In addition to functional components, FIG. 5 also shows selected example inputs, outputs, and intermediate products of example operation. The functional components of the ASR system 500 include a feature analysis module 502, a pattern classification module 504, an acoustic model 506, a dictionary 508, and a language model 510. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It should be noted that the discussion in this section, and the accompanying figures, are presented for purposes of example. Other ASR system arrangements, including different components, different relationships between the components, and/or different processing, may be possible.

At run-time, an audio signal bearing an utterance 501 may be input to the ASR system 500, whereupon the system may generate an output 511 that could include recognized speech in the form of one or more text strings and possibly associated confidence levels. The output could also take the form of a computer-executable action or command identified or associated with the recognized speech (or other audio) content of the input utterance 501.

In some examples, the utterance 501 could include an analog or digital representation of human speech, such as a spoken word, multiple words, a phrase, multiple phrases, a sentence, multiple sentences, or other segment of speech, for example. Although not explicitly shown in the figure, the source of the utterance 501 could be a live person speaking in real time into a microphone, telephone, or other audio input/transmission device/system, that then produces and supplies the audio signal as input to the ASR system 500. The audio input/transmission device/system, also not explicitly shown in FIG. 5, could, by way of example, be a client device, such as the ones described above. Additionally or alternatively, an audio input/transmission device/system could be integrated as part of the ASR system 500. The source of the spoken utterance could also be previously-recorded speech that is played out via an audio output device/system, for example, and supplied as the audio input signal to the ASR system.

As shown in the FIG. 5, the utterance 501 may be received at the analysis module 502, which may convert utterance 501 into a sequence of one or more feature vectors 503. The conversion of the utterance 501 into the feature vectors 503 is sometimes referred to as feature extraction. As described below, each of feature vectors 503 may include temporal and/or spectral representations of the acoustic features of at least a portion of utterance 501.

Following feature extraction, the feature vectors 503 may be input to the pattern classification module 504, which may produce the output 511. By way of example, the output 511 could be one or more text string transcriptions of utterance 501. Each transcription may be accompanied by a respective confidence level indicating an estimated likelihood that the transcription is correct (e.g., 80% confidence, 90% confidence, etc.). The output 511 could also take the form of an executable application or command determined based on the recognize speech content of the utterance 501.

To produce the output 511, pattern classification module 504 may bring together and/or incorporate functionality of the acoustic model 506, the dictionary 508, and the language model 510. The acoustic model 506 is used to model the observed data, as represented in the feature vectors 503, subject to guidance and constraints supplied by the dictionary 508 and the language model 510. The modeling process determines probabilities that a particular sequence of feature vectors 503 were derived from particular sequences of spoken sub-word sounds. Modeling may also involve probabilistic mapping of sequences of feature vectors to one or more fundamental speech units (e.g., phonemes) from among a stored corpus of fundamental speech units. The acoustic model 506 is discussed in more detail below.

In a manner similar to that of the acoustic model 506, the language model 510 may assign probabilities to sequences of phonemes or words, based on the likelihood of a sequence of phonemes or words occurring in an input utterance to the ASR system. Thus, for example, language model 510 may define the conditional probability of $w_n$ (the nth word in a phrase transcribed from an utterance), given the values of the pattern of n−1 previous words in the phrase. This conditional probability can be expressed formally as $P(w_n|w_1, w_2, \ldots, w_{n-1})$.

Consideration of certain aspects of the example ASR system 500 in more detail may be useful to further understanding example embodiments. In practice, the feature analysis module 502 may sample and quantize utterance 501 within a time sequence of overlapping or non-overlapping temporal frames, and perform spectral analysis on the frames to derive a feature vector associated with each frame. For example, each frame could be acquired in a sliding time window that is periodically advanced. Each advance of the time window could be in increments measured in fractional units of the width of the time window. By way of example, the width of each frame (and of the sliding time window) could be 25 milliseconds (ms), and the time increment between each frame acquisition could be 10 ms. With this configuration, each new 25 ms frame would advance by 10 ms past the end of the previous frame, and the first 15 ms of each new 25 ms frame would overlap with the last 15 ms of the previous frame. Thus, every two consecutive frames would contain 15 ms of common audio data (e.g. of an utterance). Other frame sizes, window sizes, and time increment sizes could be used as well.

Feature extraction produces a feature vector for each frame of sampled audio data (e.g. of the utterance 501). By way of example, each feature vector may include Mel Filter Cepstral (MFC) coefficients of each frame of the utterance 501, as determined by the feature analysis module 502. MFC coefficients may represent the short-term power spectrum of a portion of utterance 501, and may be based on, for example, a linear cosine transform of a log power spectrum on a non-linear Mel scale of frequency. (A Mel scale may be a scale of pitches subjectively perceived by listeners to be about equally distant from one another, even though the actual frequencies of these pitches are not equally distant from one another.) The feature analysis module 502 may further perform noise removal and convert the standard spectral coefficients to MFC coefficients, and then calculate first-order and second-order cepstral derivatives of the MFC coefficients.

The first-order cepstral coefficient derivatives may be calculated based on the slopes of linear regressions performed over windows of two or more consecutive frames. The second-order cepstral coefficient derivatives may be calculated based on the slopes of linear regressions performed over windows of two or more consecutive sets of first-order cepstral coefficient derivatives. However, there may be other ways of calculating the first-order and second-order cepstral coefficient derivatives.

In some embodiments, one or more frames of utterance 501 may be represented by a feature vector of MFC coefficients, first-order cepstral coefficient derivatives, and second-order cepstral coefficient derivatives. For example, the feature vector may contain 13 coefficients, 13 first-order derivatives, and 13 second-order derivatives, therefore having a length of 39. However, feature vectors may use different combinations of features in other possible embodiments. As another example, feature vectors could include Perceptual Linear Predictive (PLP) coefficients, Relative Spectral (RASTA) coefficients, Filterbank log-energy coefficients, or some combination thereof. Each feature vector may be thought of as including a quantified characterization of the acoustic content of a corresponding temporal frame of the utterance 501 (or more generally of an audio input signal).

The corpus applied in the modeling procedure may include a large collection of stored speech samples that have been digitally processed, deconstructed, and categorized into a set of fundamental units corresponding to speech sounds, such as phonemes. The corpus may also include a set of units corresponding to larger speech segments (e.g., words, phrases, etc.). The fundamental units may also have associated "tags" or labels that can be used to identify them for purposes of generating text or other output from strings or sequences of units, for example.

As discussed above, a fundamental unit of speech that is suitable for use in the modeling procedure is a phoneme. A phoneme may be considered to be the smallest segment of an utterance that encompasses a meaningful contrast with other segments of utterances. Thus, a word typically includes one or more phonemes. For purposes of simplicity, phonemes may be thought of as utterances of letters, although this is not a perfect analogy, as some phonemes may present multiple letters. As an example, the phonemic spelling for the American English pronunciation of the word "cat" is /k/ /ae/ /t/, and consists of the phonemes /k/, /ae/, and /t/. Another example is the phonemic spelling for the word "dog" is /d/ /aw/ /g/, consisting of the phonemes /d/, /aw/, and /g/. Different phonemic alphabets exist, and other phonemic representations are possible. Common phonemic alphabets for American English contain about 40 distinct phonemes. Each of these phonemes can be represented in a quantifiable form as a distribution of feature vector values.

In the context of typical speech, phonemes frequently occur in triplet combinations referred to as triphones, whereby a given phoneme appears in the context of a preceding phoneme and a following (subsequent) phoneme. By convention, the preceding phoneme is called the "left context" and the following (subsequent) phoneme is called the "right context." Thus, the ordering of the phonemes of a triphone corresponds to the direction in which English is read.

Triphones capture how acoustic properties of a phoneme can depend on what precedes and follows it in a particular, spoken word. As an example, the word "dad" when spoken could be considered to be constructed of phoneme sequence [d], [ae], and [d], where the brackets ("[ ]") identify the particular phoneme being spoken, and the forward-slash ("/") notation has been dropped for the sake of brevity. In isolation (or following a pause after a preceding word, for example), the first triphone of "dad" would be "#[d]ae." The left-context phoneme "#" signifies the start of the first [d] phoneme with nothing (e.g., a pause) preceding it (e.g, silence), and the right-context phoneme "ae" signifies the a-sound (as in "dad") following it. Both the left and right contexts influence how the [d] phoneme is rendered acoustically. The next triphone would be "d[ae]d," in which the acoustic properties of the [ae] phoneme are influenced by the both the left-context (preceding) phoneme "d" and the right-context (following) phoneme "d." Finally, the last triphone would be be "ae[d]#," in which the acoustic properties of the final [d] phoneme are influenced by the both the left-context (preceding) phoneme "ae" and the right-context (following) phoneme "#" that signifies the end of the word (e.g., no further sound).

b. Example HMM Implementation with NN-Based Emission Probabilities

In accordance with example embodiments, the acoustic model 506 may include a neural network (NN) and one or more hidden Markov models (HMMs). Such an implementation is referred to herein as a "hybrid neural network/hidden Markov model," and is abbreviated as "HNN/HMM" (or "HNN/HMMs" in reference to a plurality of HMMs). In a HNN/HMM implementation, one or more HMMs are used to model the fundamental speech units (e.g., phonemes, triphones, etc.), while the neural network is used to determine emission probabilities to apply to the models, based on the observed data (e.g., sequence of feature vectors 503 in the example ASR system 500). For purposes of the discussion herein, the fundamental speech units of HMMs will be taken to be triphones, since this is the case in practice for certain ASR systems. It will be appreciated, however, that the principles discussed is not limited to triphones, and that other fundamental speech units can be used (e.g. phonemes, quinphones, clusters of similar and/or related speech units, etc.).

As a spoken sound, a triphone may be modeled as temporally evolving according to a sequence of temporal phases. It has been observed empirically, for example, that triphones may typically manifest in speech across three acoustic phases: a start, a middle, and an end. The HMM for a given triphone therefore can be constructed having three states, one corresponding to each acoustic phase. Transitions between states are governed by transition probabilities of the model, and one or more states could include self-transitions that "loop" back to themselves. In addition, each state has an associated emission probability for emitting an output corresponding to the acoustic phase of the triphone. Thus, the HMM for a given triphone is characterized by probabilities of transitioning from a current state to a next state, and upon transitioning, a respective probability of producing (emitting) the acoustic phase associated with the next state. As described below, the emission probabilities may be determined by the neural network, based on the observed utterance as represented in the feature vectors derived from the utterance.

Returning first to the example of the word "dad," the triphone sequence described above could be modeled with three HMM states each. For example, the triphone "#[d]ae" could be modeled according to states corresponding to "#[d]ae.1," "#[d]ae.2," and "#[d]ae.3," where the "0.1," "0.2," and "0.3" signify a temporal order of the states in the HMM for the triphone "#[d]ae." Similarly, the triphone "d[ae]d" could be modeled with a HMM having states corresponding to "d[ae]d.1," "d[ae]d.2," and "d[ae]d.3," and the triphone "ae[d]#" could be modeled with a HMM having states corresponding to "ae[d]#.1," "ae[d]#.2," "ae[d]#.3." This description could be generalized to different number of acoustic phases of triphones (as well as to other phoneme sequences).

The sequential feature vectors 503 derived from the utterance 501 represent a stream of observed acoustic data, while sequential states of one or more concatenated HMMs represent sequences of acoustic phases of triphones in the corpus that probabilistically correspond to the observed acoustic data. While the possible states and their associated transition and emission probabilities of the HMMs may be known, the specific state sequences associated with any given observed sequence of feature vectors is not a priori known (hence the term "hidden"). Recognition of speech in the input utterance 501 therefore involves determining the most probable sequence (or sequences) of states of one or more concatenated HMMs that would produce the observed feature vectors 503. The most probable sequence of states then corresponds to the most probable sequence of triphones (including acoustic phases), from which the output 511 can be determined.

In a HNN/HMM implementation, the determination of the most probable sequences of HMMs and states is carried out one step at a time, where each step corresponds to a feature vector in the sequence 503, and by extension to a frame of sampled audio data. The process can be guided at each new step by the results of the previous step, since the most probable state determined for the previous step may constrain the possible (allowed) states that can be transitioned to on the next step. Thus, for each particular feature vector and each allowed next state, the NN determines a conditional probability that the particular feature vector would be emitted given the allowed next state.

More particularly, the NN may be trained before run time to recognize feature vectors as input, and to generate associated conditional probabilities as output. Then, at each time step corresponding to a frame at run time, the NN, based on what it has "learned" during training, generates a posterior conditional probability of being in the particular allowed next state, given the observed run-time feature vector. On the other hand, the emission probability for each particular allowed next state is a prior conditional probability of emitting the observed feature vector, given that the HMM is in the particular allowed next state. The prior conditional probability—i.e., the emission probability—can be related to the posterior conditional probability through Bayes rule.

In specific terms, the NN may be trained to be able to produce, at run time, the posterior conditional probability $p(q_k|x_j)$, corresponding to the a posteriori probability of the HMM state $q_k$ given the acoustic data $x_j$ observed at run time. The index $k=1, \ldots, K$ runs over K allowed next states of a concatenation of HMM states, while the $x_j$, $j=1, \ldots, S$ may be taken as a feature vector having S acoustic features. As noted, the training of the NN may take place before run time, using training data (e.g., from the corpus). For the HMM states, Bayes rule can be expressed as:

$$p(x_j)/p(x_j|q_k)=p(q_k)/p(q_k|x_j), \quad [1]$$

where $p(q_k)$ gives the prior probabilities for the $q_k$ states, and $p(x_j)$ gives the probabilities for the acoustic features. Before run time, the ASR system may also be trained to generate expected output (e.g., text strings) from known input speech (e.g., utterances), from which relative frequencies of the $q_k$, $k=1, \ldots, K$ states, and correspondingly the prior probabilities $p(q_k)$ for the $q_k$ states may be determined. In addition, the probabilities $p(x_j)$ are the same for all states at run time, and so may be treated as a scaling constant in the expression for Bayes rule. It may therefore be seen that the a priori emission probabilities $p(x_j|q_k)$ for the $q_k$, k=1, ..., K states follow from Bayes rule (equation [1] above) applied at run time for the HMM states.

Once the emission probabilities for all the allowed next states of a time step are computed, the most probable next state for that time step can be determined as the one that maximizes the combined likelihood of being transitioned to, and emitting the observed feature vector. In this manner, the most probable sequence of states corresponding to a sequence of feature vectors is determined, and from which follows the most probable sequence of fundamental speech units in the corpus and a reconstruction of the utterance in the audio input signal.

One of the aspects of using a neural network for determining the emission probabilities is that correlations among feature vectors are accounted for naturally in the "learning" process during training Consequently, categorization of feature vectors corresponding to the speech samples of the corpus can avoid simplifying assumptions often required by other analysis techniques, such as Gaussian mixture models, to deal with statistical complexities. Moreover, the ability of neural networks to naturally account for correlations among feature vectors also enables determination of the probabilities for a given input feature vector to include input from a subsequence of feature vectors preceding and/or following the given feature vector. Feature vectors preceding and/or following a given feature vector can thereby provide additional context for the neural network.

Artificial neural networks (ANNs) may be considered as implementations of a variety classes of regression algorithms and function approximators, including but not limited to feed-forward networks, back-propagation neural networks, convolutional networks, time-delay neural networks, and mixture-density networks. In particular, feed-forward networks may take the form of a multiplicity of interconnected "layers," each including a set of "nodes." A typical architecture may include an input layer, and output layer, and one or more intervening layers, commonly referred to as "hidden" layers.

Each node in a given layer may correspond to a mathematical function for computing a scalar output of one or more inputs. For example, the nodes of the input layer typically each receive just one input at a given computational step (e.g., time step), the total number of inputs to the neural network being the total number of nodes in the input layer. The computed outputs of each input-layer node may then serve as input to each node of the next (forward) layer. The nodes of the output layer deliver the output of the neural network, the total number of outputs of neural network being the total number of nodes in the output layer.

All of the nodes may be the same scalar function, differing only according to possibly different parameter values, for example. By way of example, the mathematical function could take the form of a sigmoid function, in which case each node could compute a sigmoidal nonlinearity of a weighted sum of its inputs. It will be appreciated that other functional forms could be used as well. Training a neural network may typically involve adjusting parameter values to achieve, to a given level of confidence, known results from known input data. A variety of techniques may be used to train a neural network, including stochastic gradient descent, batch gradient descent, second order methods, Hessian-free optimization, and gradient boost, among possibly others.

As described above, application of a neural network to speech recognition involves providing one or more feature vectors as input, and delivering emission probabilities as output. The effectiveness and/or accuracy of a neural network may depend, at least in part, on the number of nodes per layer, and the number of hidden layers between the input and output layers. Some early applications using neural network with just a single hidden layer helped demonstrate potential benefits of the approach, but the quality of the results may have been partially limited due to practical limitations of size and speed of the neural networks.

More recently, advances in both hardware and machine learning algorithms have helped make it possible to increase the size and efficiency of neural networks. In particular, neural networks with multiple hidden layers can handle large numbers of inputs, which may be characteristic of multiple feature vectors, as well as large numbers of outputs, which can help accommodate emission probabilities corresponding to the large number of HMM states needed for accurate speech modeling. A feed-forward neural network that includes multiple hidden layers is customarily referred to as a "Deep Neural Network" ("DNN").

In accordance with example embodiments, a HNN/HMM speech recognition system may include a DNN for generation of emission probabilities. By incorporating multiple hidden layers, predicted emission probabilities for a given sequence of input feature vectors may be accurately predicted, correspondingly supporting accurate speech recognition. By appropriately adjusting the respective parameter values of the functions of the nodes during a training process using a large corpus of training data, a DNN can learn to accurately predict emission probabilities given run-time feature vectors.

A DNN, and a neural network in general, including its layers, nodes, and connections between nodes may be implemented as executable instructions stored in one or another form of non-transient computer readable media, and executed by one of more processors of speech synthesis system, for example.

Figure 6:
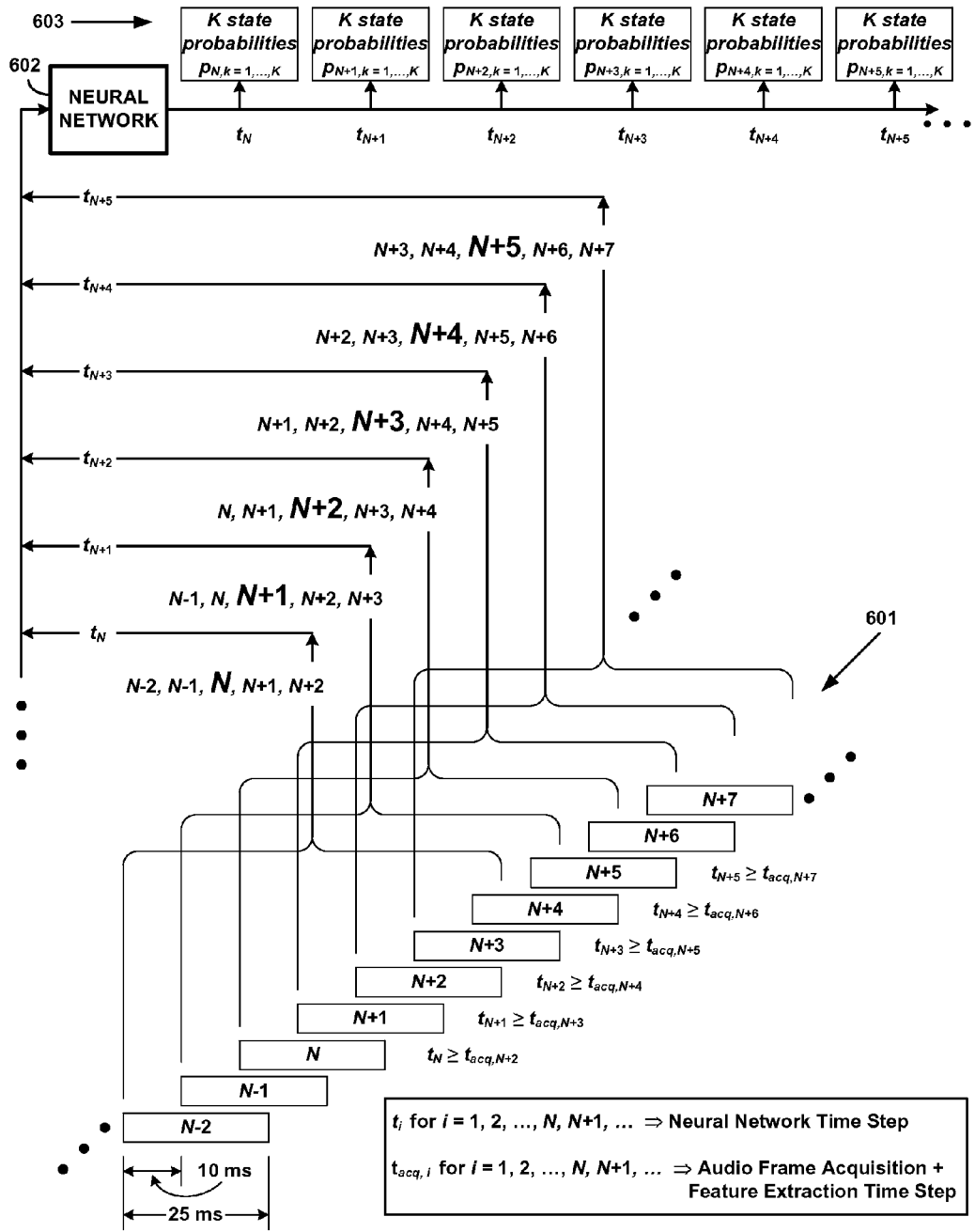
FIG. 6 is a schematic illustration of processing of feature vectors with a neural network (NN) to determine NN-based emission probabilities for hidden Markov models, in accordance with an example embodiment.

FIG. 6 is a schematic illustration of processing of feature vectors with a neural network (e.g., a DNN) to determine emission probabilities for hidden Markov models. In the figure, a time sequence of feature vectors 601 is represented by a "staircase" of overlapping rectangles labeled, by way of example, N−2, N−1, ..., N, N+1, ..., N+7, where each label corresponds to a frame time step at which the input audio data was acquired (e.g., digitally sampled). The representation of the feature vectors 601 as overlapping rectangles is meant as an indication that each feature vector corresponds to a frame of sampled audio input (e.g., an utterance), and that each frame may be acquired in a sliding time window. As illustrated by way of example in FIG. 6, each frame (i.e., the time window) is 25 ms in duration, and the time increment between successive windows is 10 ms. With this configuration, each next frame overlaps the previous frame by 15 ms. The time increment between frames (e.g., 10 ms in the present example) can be referred to as the frame period; the inverse of the frame period can be referred as the frame rate (100 frames per second in the present example).

The feature vectors 601 in FIG. 6 may be the output of sampling and digital processing, such as by the feature analysis module 502 shown in FIG. 5. The frame-like representation of the feature vectors 601 may thus be taken as a visual cue that digital samples of the input utterance 501 may be acquired in time frames using a sliding window, and then subject to feature extraction. In the example operation illustrated in FIG. 6, each frame of audio data may be acquired (e.g., digitally sampled) at an "acquisition time" $t_{ack,i}$, i=

1, 2, . . . , N, N+1, . . . For purposes of the present discussion, $t_{ack,i}$ may also be considered the time at which feature extraction is performed, although this is not necessarily a restriction of embodiments described herein.

Each feature vector of the sequence 601 may then be presented as input to a neural network 602 for processing at a respective "neural network time step" $t_i$, i=1, 2, . . . , N, N+1, . . . . Note that the $t_i$ may not necessarily be equal to $t_{ack,i}$ for a given value of i=N. As explained below, for example, the input to the neural network 602 at $t_{i=N}$ may include a feature vector corresponding to a frame acquired at $t_{ack,i=N}$, as well as one or more feature vectors corresponding to frames acquired at times after (and possibly before) $t_{ack,i=N}$. In this case, $t_{i=N} \geq t_{ack,i=N+m}$, where m is the number of additional feature vectors (and frames) following frame N (i.e., right-context frames). For the illustration in FIG. 6, each feature vector input to the neural network 602 includes feature vectors corresponding to two subsequent (and two preceding) frames; hence $t_{i=N} \geq t_{ack,i=N+2}$ for each value of N, as indicated for this example. The legend at lower right of FIG. 6 reiterates the meanings of $t_i$ and $t_{ack,i}$.

By way of example in FIG. 6, feature vectors corresponding to frame times $t_{ack,N}$, $t_{ack,N+1}$, . . . , $t_{ack,N+5}$ (and labeled N, N+1, . . . , N+5) are shown at being input to the neural network at neural network time steps $t_N$, $t_{N+1}$, . . . , $t_{N+5}$. At each neural network time step, each feature vector is shown as being "accompanied" by two preceding (left-context) and two following (right-context) feature vectors corresponding to preceding and following frame acquisition times.

For example, the input to the neural network 602 at neural network time step $t_N$ includes the feature vector labeled N, together with feature vectors labeled N−2, N−1, N+1, and N+2, corresponding to frame acquisition times $t_{ack,N-2}$, $t_{ack,N-1}$, $t_{ack,N}$, $t_{ack,N+1}$, and $t_{ack,N+2}$. Similarly, the input to the neural network 602 at neural network time step $t_{N+1}$ includes the feature vector labeled N+1, together with feature vectors labeled N−1, N, N+2, and N+3, corresponding to frame acquisition times $t_{ack,N-1}$, $t_{ack,N}$, $t_{ack,N+1}$, $t_{ack,N+2}$, and $t_{ack,N+3}$. This pattern is extended in the figure up to neural network time step $t_{N+5}$ for the feature vector labeled N+5, together with feature vectors labeled N+3, N+4, N+6, and N+7, corresponding to frame acquisition times $t_{ack,N+3}$, $t_{ack,N+4}$, $t_{ack,N+5}$, $t_{ack,N+6}$, and $t_{ack,N+7}$. It will be appreciated that other arrangements of multiple feature vector input could be used. For instance, each feature vector could be accompanied by four preceding and four following feature vectors. In addition, the number of preceding and following feature vectors need not be equal.

In a HNN/HMM implementation, the neural network 602 may generate at each neural network time step $t_i$, i=1, 2, . . . , N, N+1, . . . , a set of K emission probabilities $p(x_j|p_k)$ for $q_k$, k=1, . . . , K HMM states according, for example, to equation [1]. As such, the neural network 602 may be considered as operating at the input frame rate. In FIG. 6, for example, a set of K emission probabilities 603 is generated at each of neural network time steps $t_N$, $t_{N+1}$, $t_{N+2}$, $t_{N+3}$, $t_{N+4}$, and $t_{N+5}$. The emission probabilities 603, designated "K state probabilities" in this example, are labeled $p_{N,k=1}, \ldots, K$ at $t_N$; $p_{N+1,k=1}, \ldots, K$ at $t_{N+1}$; $p_{N+2,k=1}, \ldots, K$ at $t_{N+2}$; $p_{N+3,k=1}, \ldots, K$ at $t_{N+3}$; $p_{N+4,k=1}, \ldots, K$ at $t_{N+4}$; and $p_{N+5,k=1}, \ldots, K$ at $t_{N+5}$. Thus, although multiple feature vectors are presented as input to the neural network 602 at each neural network time step, the output set of emission probabilities may apply to the HMM states at just one frame time, corresponding to just one frame of input audio data.

Figure 7:
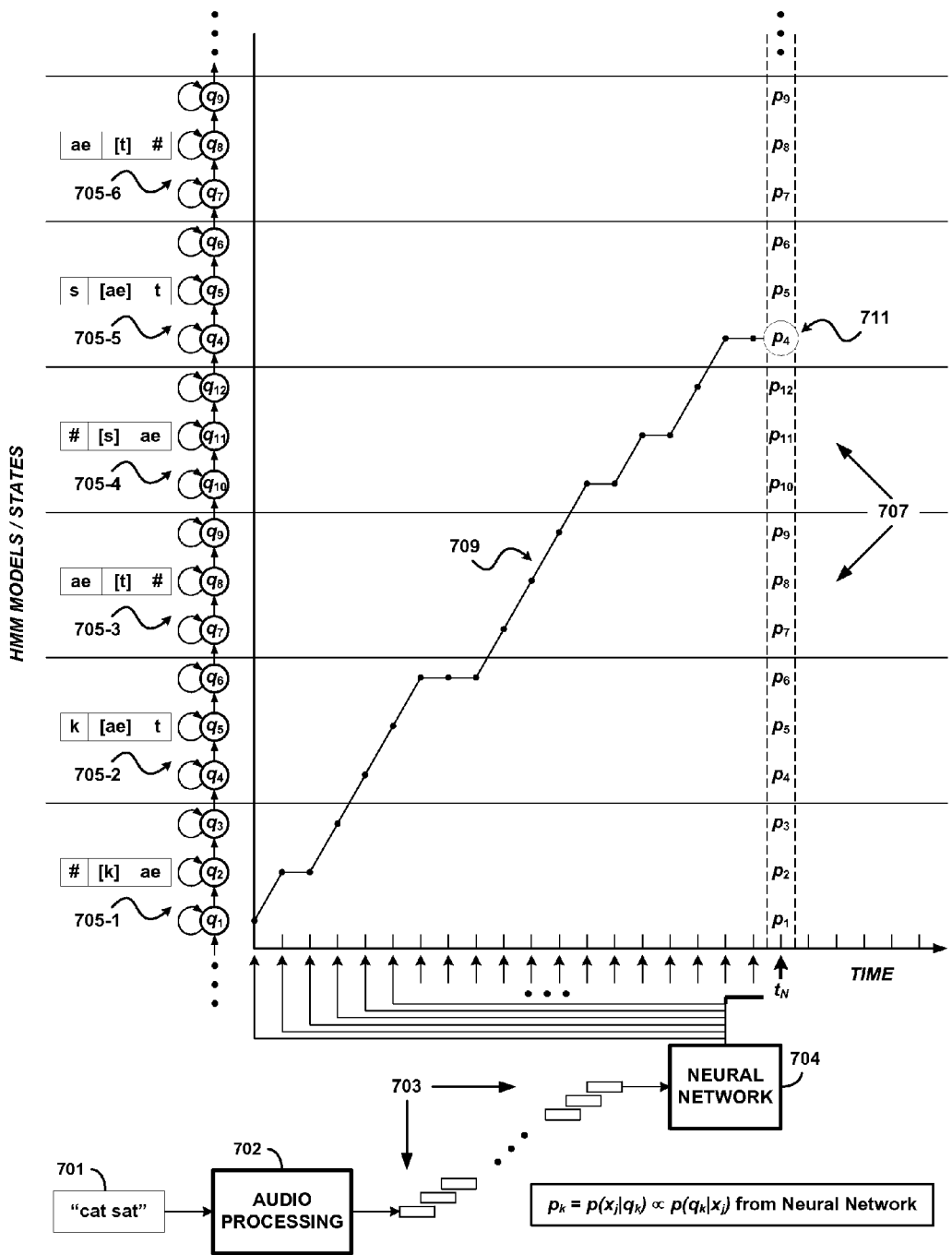
FIG. 7 is a schematic illustration of applying NN-based emission probabilities determined by a neural network to hidden Markov models to determine speech content represented in feature vectors, in accordance with an example embodiment.

Application of emission probabilities to hidden Markov models to determine speech content represented in feature vectors is illustrated schematically in FIG. 7, which depicts a graph of observed acoustic data along a time (horizontal) axis versus HMM states along a vertical axis. In the figure, an example utterance 701 of "cat sat" is input to an audio processing module 702, which samples the input in frames and outputs a time sequence of feature vectors 703. The feature vectors 703 are then input to a neural network 704, which outputs respective sets of emission probabilities at each neural network time step. The feature vectors 703 may be considered analogous to the feature vectors 601 shown in FIG. 6, and the neural network 704 may be considered analogous to the neural network 602 also in FIG. 6. Output of the emission probabilities at neural network time steps is represented as a series of short vertical arrows at times marked along the horizontal time axis, and occurs at the frame rate.

A multiplicity of HMMs 705-1, 705-2, 705-3, 705-4, 705-5, and 705-6 is represented as a portion of a concatenation of HMM states pictured along the vertical axis in FIG. 7. Each HMM is used to model a respective triphone, and includes three states corresponding to three acoustic phases of the respective triphone. Each state is represented as a circle enclosing a state label $q_k$, such as $q_1$, $q_2$, $q_3$, etc. An arrow connecting adjacent states signifies a transition between the connected states, while a loop-shaped arrow signifies a "self-transition" that leaves a state unchanged after a given time step.

By way of example, the HMM 705-1 includes states $q_1$, $q_2$, and $q_3$ for modeling the triphone states #[k]ae.1, #[k]ae.2, and #[k]ae.3 of the triphone #[k]ae. Similarly, the HMM 705-2 includes states $q_4$, $q_5$, and $q_6$ for modeling the triphone states k[ae]t.1, k[ae]t.2, and k[ae]t.3 of the triphone k[ae]t. Continuing in this way, the HMM 705-3 includes states $q_7$, $q_8$, and $q_9$ for modeling the triphone states ae[t]#.1, ae[t]#.2, and ae[t]#.3 of the triphone ae[t]#; the HMM 705-4 includes states $q_{10}$, $q_{11}$, and $q_{12}$ for modeling the triphone states #[s]ae.1, #[s]ae.2, and #[s]ae.3 of the triphone #[s]ae; the HMM 705-5 includes states $q_4$, $q_5$, and $q_6$ for modeling the triphone states s[ae]t.1, s[ae]t.2, and s[ae]t.3 of the triphone s[ae]t; and the HMM 705-6 includes states $q_7$, $q_8$, and $q_9$ for modeling the triphone states ae[t]#.1, ae[t]#.2, and ae[t]#.3 of the triphone ae[t]#.

Note that, for purposes of illustration, the HMM 705-2 for k[ae]t and the HMM 705-5 for s[ae]t are made up of the same states $q_4$, $q_5$, and $q_6$. This repetition of states is meant to represent how HMM and HMM states may be shared among similar triphones. Similarly, the HMM 705-3 for ae[t]# and the HMM 705-6 also for ae[t]# are made up of the same states $q_7$, $q_8$, and $q_9$. The sharing of states is an example of "clustering" of similar triphones, which may help reduce the number of states that needs to be considered at each time step, as described below.

For a HNN/HMM implementation such as in the present example, the neural network 704 outputs of K emission probabilities for the states of the HMMs at each neural network time step; i.e. at the frame rate. By applying the K emission probabilities to the K HMM states, one of the K states is determined to be most probable at each neural network time step. By repeating this determination at each neural network time step, a path 709 through the graph of observed acoustic data versus HMM states is mapped out by connecting successive points in the graph, also at the frame rate. The path 709 then represents the most likely sequence of HMMs and HMM states, and thereby yields the sequence of triphones in the corpus that most probably corresponds to the input utterance 701, as represented in the feature vectors 703.

By way of example in FIG. 7, a set of emission probabilities 707 is shown as being output from the neural network 704 at a current neural network time step $t_N$. The emission probabilities 707 are labeled as $p_1, p_2, p_3, p_4, \ldots$, and may be applied to similarly indexed HMM states. Note that $p_4, p_5$, and $p_6$ are repeated for the HMMs 705-2 and 705-5. Similarly, $p_7, p_8$, and $p_9$ are repeated for the HMMs 705-3 and 705-6. As indicated by the circle 711 enclosing probability $p_4$, the HMM state $q_4$ of the HMM 705-5 is the most probable next state in this example. The immediately preceding state in this example was also $q_4$ of the HMM 705-5. A legend at the lower right of FIG. 7 reiterates the proportional relation between the a priori emission probabilities and the a posteriori conditional probabilities generated by the neural network.

As indicated by the vertical ellipses extending from HMM 705-6, there may be additional HMMs (and states) available to model the input utterance 701. In particular, considering 40 phonemes (the approximate number for spoken English), there could be approximately $40^3=64,000$ triphones, and thus $3\times64,000=192,000$ possible HMM triphone states to consider for each feature vector. Clustering of similar triphones and/or triphone acoustic phases, plus constraints that may rule out certain sequences of states, can help reduce this number to approximately 8,000 HMM states. Clustering is represented in FIG. 7 by the repetition of states (e.g., for HMMs 705-2 and 705-5; and for HMMs 705-3 and 705-6), and the repetition of emission probabilities (e.g., $p_4, p_5,$ and $p_6$; and $p_7, p_8,$ and $p_9$).

c. Example HMM Implementation with GMM-Based Emission Probabilities

In accordance with example embodiments, the acoustic model 506 may also include an implementation (e.g., one or more coded algorithms) of a Gaussian mixture model (GMM). It will be appreciated the singular term GMM applies to a collection or one or more mixtures of Gaussian distributions. As with the HNN/HMM implementation, the same one or more HMMs are used to model the fundamental speech units (e.g., phonemes, triphones, etc.). However, the GMM is used to determine emission probabilities to apply to the models, based on the observed data (i.e., sequence of feature vectors 503 in the example ASR system 500). Again for purposes of the discussion herein, the fundamental speech units of HMMs will be taken to be triphones, since this is the case in practice for certain ASR systems. It will be appreciated, however, that the principles discussed is not limited to triphones, and that other fundamental speech units can be used (e.g. phonemes, quinphones, clusters of similar and/or related speech units etc.).

In a GMM implementation, the determination of the most probable sequences of HMMs and states is again carried out one step at a time, where each step corresponds to a feature vector in the sequence 503, and by extension to a frame of sampled audio data. As discussed above, the particular set of defining features in the feature vectors used in the GMM approach may not necessarily be the same as the set used in NN approach. For purposes of illustration, any such distinction between the defining features in feature vectors used in the GMM and NN approaches is may not necessarily be apparent in the sequence 503, which, at the level of FIG. 5, can be considered as input to either approach.

As with the HNN/HMM approach, the process of determining the most probable sequence of state corresponding to the input sequence of feature vectors can be guided at each new step by the results of the previous step, since the most probable state determined for the previous step may constrain the possible (allowed) states that can be transitioned to on the next step. Thus, for each particular feature vector and each allowed next state, the GMM determines a conditional probability that the particular feature vector would be emitted given the allowed next state.

More particularly, the GMM may be trained before run time to associate feature vectors with conditional probabilities as output. That is, at each time step corresponding to a frame at run time, GMM is used to determine, for each respective HMM state, a conditional probability of observing the feature vector at that time step given the respective HMM state. Thus for each frame, a plurality of GMM-based conditional probabilities is computed, one for each HMM state.

In formal terms, a Gaussian mixture model can be described as a weighted sum of M Gaussian densities, given by the expression:

$$p(x \mid \lambda) = \sum_{i=1}^{M} w_i g(x \mid \mu_i, \Sigma_i), \quad [2]$$

where x is a D-dimensional continuous-valued vector (i.e., features), $w_i$, i=1, ..., M, are the mixture weights, and $g(x \mid \mu_i, \Sigma_i)$, i=1, ..., M, are the component Gaussian densities. Each component density is a D-variate Gaussian function of the form:

$$g(x \mid \mu_i, \Sigma_i) = \frac{1}{(2\pi)^{D/2} |\Sigma_i|^{1/2}} \exp\left\{-\frac{1}{2}(x-\mu_i)' \Sigma_i^{-1} (x-\mu_i)\right\}, \quad [3]$$

with mean vector $\mu_i$ and covariance matrix $\Sigma_i$.

During training, the parameters are adjusted for known fundamental speech units to produce mixtures that probabilistically represent the features as observed in the known fundamental speech units. As with the neural network approach, the fundamental speech units could be phonemes, triphones, or clustering of similar triphones and/or triphone acoustic phases. GMM techniques are generally well-known, and not discussed in further detail herein.

Once the GMM-based emission probabilities for all the allowed next states of a time step are computed, the most probable next state for that time step can be determined in the same manner as in the HNN/HMM approach. Namely, most probable next state is the one that maximizes the combined likelihood of being transitioned to, and emitting the observed feature vector. As in the HNN/HMM approach, the most probable sequence of states corresponding to a sequence of feature vectors is determined, and from which follows the most probable sequence of fundamental speech units in the corpus and a reconstruction of the utterance in the audio input signal.

While the GMM approach may include simplifying assumptions, such as assuming negligible and/or ignorable correlations of features and/or feature vectors, the implementation costs, both in terms of computational complexity and processing resources, may be significantly smaller than those of the HNN/HMM approach. Moreover, in spite of the simplifying assumptions, the GMM approach may nevertheless yield largely equivalent, or even better, predictive results than the HNN/HMM for a certain subset of fundamental speech units.

Figure 8:
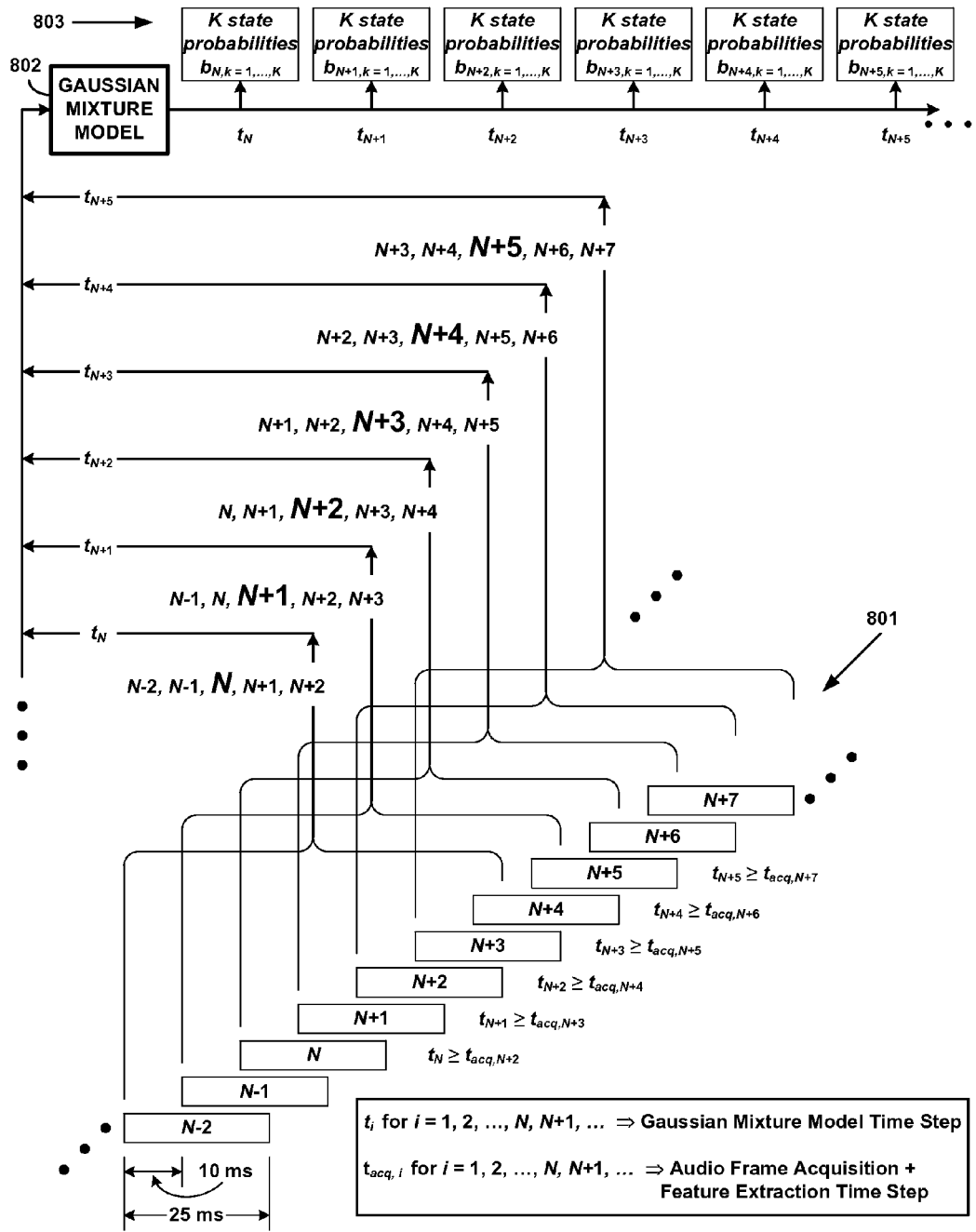
FIG. 8 is a schematic illustration of processing of feature vectors with a Gaussian mixture model (GMM) to determine GMM-based emission probabilities for hidden Markov models, in accordance with an example embodiment.

FIG. 8 is a schematic illustration of processing of feature vectors with a GMM to determine emission probabilities for hidden Markov models. In the figure, a time sequence of feature vectors 801 is represented again by a "staircase" of overlapping rectangles labeled, by way of example, N−2, N−1, . . . , N, N+1, . . . , N+7, where each label corresponds to a frame time step at which the input audio data was acquired (e.g., digitally sampled). The representation of the feature vectors 801 is the same as that of feature vectors 601 in FIG. 6, and the previous explanation of feature vectors 601 apply to feature vectors 801 as well. As noted above, however, the specific defining features of the feature vectors 801 may be different than those feature vectors 601.

Each feature vector of the sequence 801 may then be presented as input to a GMM 802 for processing at a respective "GMM time step" $t_i$, i=1, 2, . . . , N, N+1, . . . . As with the sequence 601, $t_i$ may not necessarily be equal to $t_{ack,i}$ for a given value of i=N, and the input to the GMM 802 at $t_{i=N}$ may include a feature vector corresponding to a frame acquired at $t_{ack,i=N}$, as well as one or more feature vectors corresponding to frames acquired at times after (and possibly before) $t_{ack,i=N}$. In this case, $t_{i=N} \geq t_{ack,i=N+m}$, where m is the number of additional feature vectors (and frames) following frame N. For the illustration in FIG. 8, each feature vector input to the GMM 802 again includes feature vectors corresponding to two subsequent (and two preceding) frames; hence $t_{i=N} \geq t_{ack,i=N+2}$ for each value of N, as indicated for this example. The legend at lower right of FIG. 8 reiterates the meanings of $t_i$ and $t_{ack,i}$.

By way of example in FIG. 8, feature vectors corresponding to frame times $t_{ack,N}$, $t_{aCk,N+1}$, . . . , $t_{ack,N+5}$ (and labeled N, N+1, . . . , N+5) are shown at being input to the GMM at neural GMM steps $t_N$, $t_{N+1}$, . . . , $t_{N+5}$. At each GMM time step, each feature vector is shown as being "accompanied" by two preceding (left-context) and two following (right-context) feature vectors corresponding to preceding and following frame acquisition times.

Note that the number of left-context and right-context feature vectors need not be the same as in the HNN/HMM approach (e.g. as illustrated in the sequence 601), and that other arrangements of multiple feature vector input could be used. For instance, each feature vector in sequence 801 could be accompanied by four left-context and four right-context feature vectors. In addition, the number of left-context and right-context feature vectors need not be equal even within just sequence 801.

In a GMM implementation, the GMM 802 may generate at each GMM time step $t_i$, i=1, 2, . . . , N, N+1, . . . , a set of K emission probabilities $b(x_j | q_k)$ for $q_k$, k=1, . . . , K HMM states according, for example. As such, the GMM 802 may be considered as operating at the input frame rate. In FIG. 8, for example, a set of K emission probabilities 803 is generated at each of GMM time steps $t_N$, $t_{N+1}$, $t_{N+2}$, $t_{N+3}$, $t_{N+4}$, and $t_{N+5}$. The emission probabilities 803, designated "K state probabilities" in this example, are labeled $b_{N,k=1,\ldots,K}$ at $t_N$; $b_{N+1,k=1,\ldots,K}$ at $t_{N+1}$; $b_{N+2,k=1,\ldots,K}$ at $t_{N+2}$, $b_{N+3,k=1,\ldots,K}$ at $t_{N+3}$, $b_{N+4,k=1,\ldots,K}$ at $t_N$ and $b_{N+5,k=1,\ldots,K}$ at $t_{N+5}$. Thus, although multiple feature vectors are presented as input to the GMM 802 at each GMM time step, the output set of emission probabilities may apply to the HMM states at just one frame time, corresponding to just one frame of input audio data.

Figure 9:
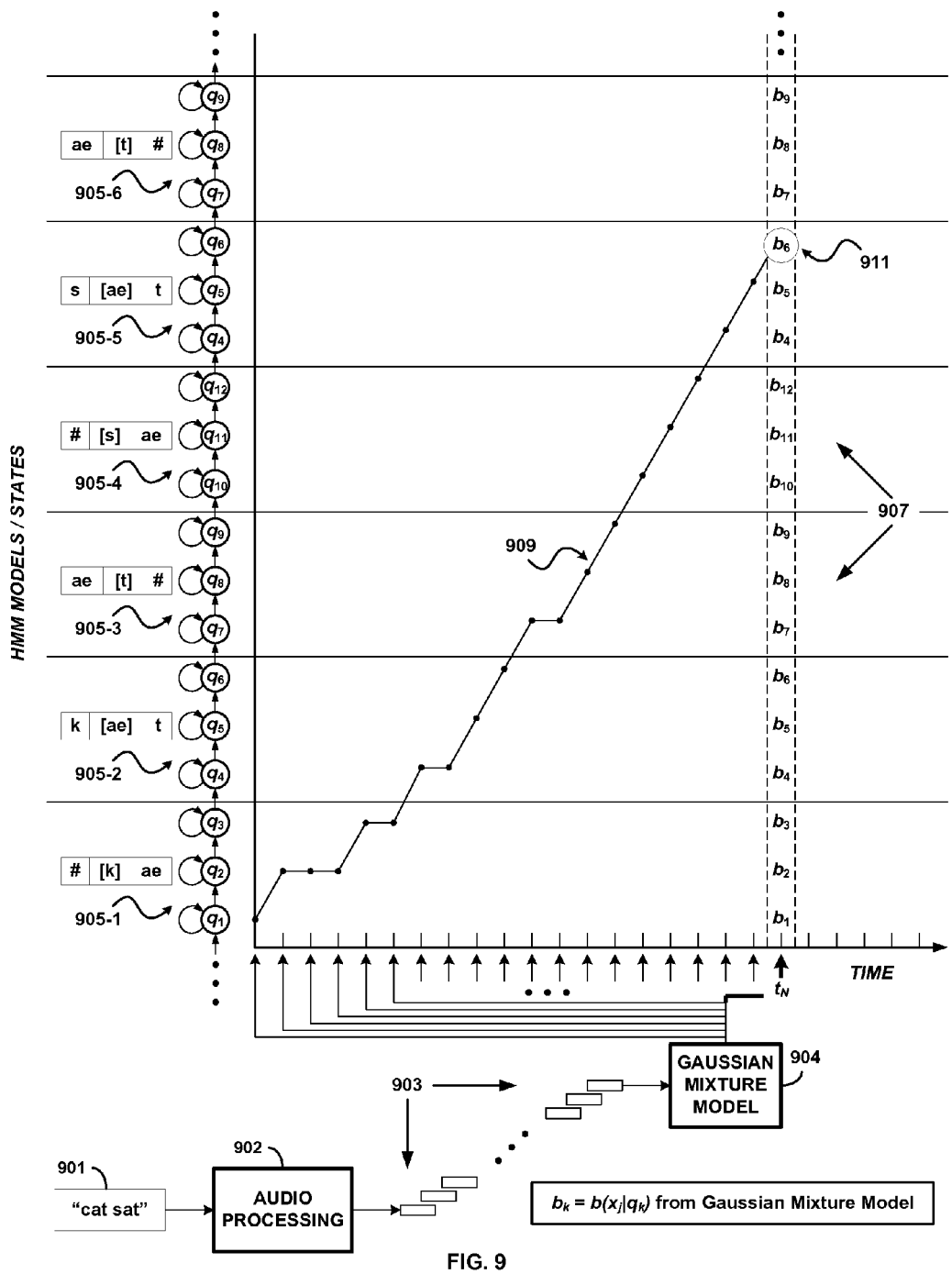
FIG. 9 is a schematic illustration of applying GMM-based emission probabilities determined by a Gaussian mixture model to hidden Markov models to determine speech content represented in feature vectors, in accordance with an example embodiment.

Application of emission probabilities to hidden Markov models to determine speech content represented in feature vectors is illustrated schematically in FIG. 9, which may be considered analogous to FIG. 7. Again, an example utterance 901 of "cat sat" is input to an audio processing module 902, which samples the input in frames and outputs a time sequence of feature vectors 903. The feature vectors 903 are then input to a GMM 904, which outputs respective sets of emission probabilities at each neural network time step. The feature vectors 903 may be considered analogous to the feature vectors 801 shown in FIG. 8, and the GMM 904 may be considered analogous to the GMM 802 also in FIG. 8. Output of the emission probabilities at GMM time steps is again represented as a series of short vertical arrows at times marked along the horizontal time axis, and occurs at the frame rate.

A multiplicity of HMMs 905-1, 905-2, 905-3, 905-4, 905-5, and 905-6 is again represented as a portion of a concatenation of HMM states pictured along the vertical axis in FIG. 9. As in FIG. 7, each HMM is used to model a respective triphone, and includes three states corresponding to three acoustic phases of the respective triphone. The format of the HMMs is the same as in FIG. 7.

For a GMM implementation such as in the present example, the GMM 904 outputs of K emission probabilities for the states of the HMMs at each GMM time step; i.e. at the frame rate. As with the HNN/HMM approach, applying the K emission probabilities to the K HMM states, determines the most probable next state at each GMM time step. By repeating this determination at each GMM time step, a path 909 through the graph of observed acoustic data versus HMM states is mapped out by connecting successive points in the graph, also at the frame rate. The path 909 then represents the most likely sequence of HMMs and HMM states, and thereby yields the sequence of triphones in the corpus that most probably corresponds to the input utterance 901, as represented in the feature vectors 903. For purposes of illustrating possibly different results yield by the GMM and HNN/HMM approaches, the path 909 is depicted as being slightly different than the path 709.

By way of example in FIG. 9, a set of emission probabilities 907 is shown as being output from the GMM 904 at a current neural network time step $t_N$. The emission probabilities 907 are labeled as $b_1$, $b_2$, $b_3$, $b_4$, . . . , and may be applied to similarly indexed HMM states. Note that $b_4$, $b_5$, and $b_6$ are repeated for the HMMs 905-2 and 905-5. Similarly, $b_7$, $b_8$, and $b_9$ are repeated for the HMMs 905-3 and 905-6. As indicated by the circle 911 enclosing probability $b_6$, the HMM state $q_6$ of the HMM 905-5 is the most probable next state in this example. The immediately preceding state in this example was $q_5$ of the HMM 905-5. A legend at the lower right of FIG. 9 defines the conditional probabilities generated by the GMM.

d. Example HMM Implementation with Merged Emission Probabilities

Each of the HNN/HMM approach and the GMM approach have relative benefits in terms of the quality of their respective speech recognition results and corresponding predicted outputs (e.g., textual renderings of the recognized speech). For example, it has been found empirically that for a common multiplicity of HMM states, the GMM approach has an accuracy of about 64% in recognizing the phoneme /iy/, while the accuracy for the NN approach is about 62%. As another example, the accuracy of the NN approach in recognizing the phoneme /ay/ is about 68%, while the accuracy of the GMM approach is about 55%. There may be other examples as well.

To the extent that each approach uses the same set of HMM states to make predictions from the same set of fundamental speech units (e.g., phonemes, triphones, or clusters of similar and/or related speech units), differences in the resulting recognition and predictions may be largely attributable to differences in the emission probabilities generated by each approach. For a common multiplicity of HMM states, both the NN and GMM generate emission probabilities for the same HMM states. Thus, for feature extraction from a common sequence of frames of an audio input signal, differences between the two approaches in the predicted sequence of HMM states may be attributable to frame-by-frame differences between the NN-based conditional probabilities and the GMM-based conditional probabilities. Since the two approaches may yield better relative predictive accuracy for different fundamental speech units, it would be desirable to merge their respective emission probabilities on a frame-by-frame basis in a way that enhances the overall accuracy compared to just one or the other of the approaches.

In accordance with example embodiments, NN-based conditional probabilities and GMM-based conditional probabilities may be merged on a frame-by-frame basis by determining weighted sums of the two types of probabilities. More specifically, for each frame of an audio input signal a feature extraction may generate two parallel sequences of feature vectors. A first sequence may be input to a neural network for computation of NN-based conditional probabilities, and a second sequence may be input to a GMM for computation of GM-based conditional probabilities. As noted above, the two sequences could be duplicates of one another, or each could carry different defining features. In either case, the two sequences would correspond with each other, and with a sequence of frames of in audio input signal, on a frame-by-frame basis. Thus, both the NN and the GMM may generate emission probabilities for the same multiplicity of HMM states on a frame-by-frame basis. On a frame-by-frame basis, then, there will be one NN-based conditional probability and one GMM-based conditional probability for each HMM state. For each HMM state, a weighted sum of the NN-based conditional probability and the GMM-based conditional probability can be computed to yield a merged probability.

Figure 10:
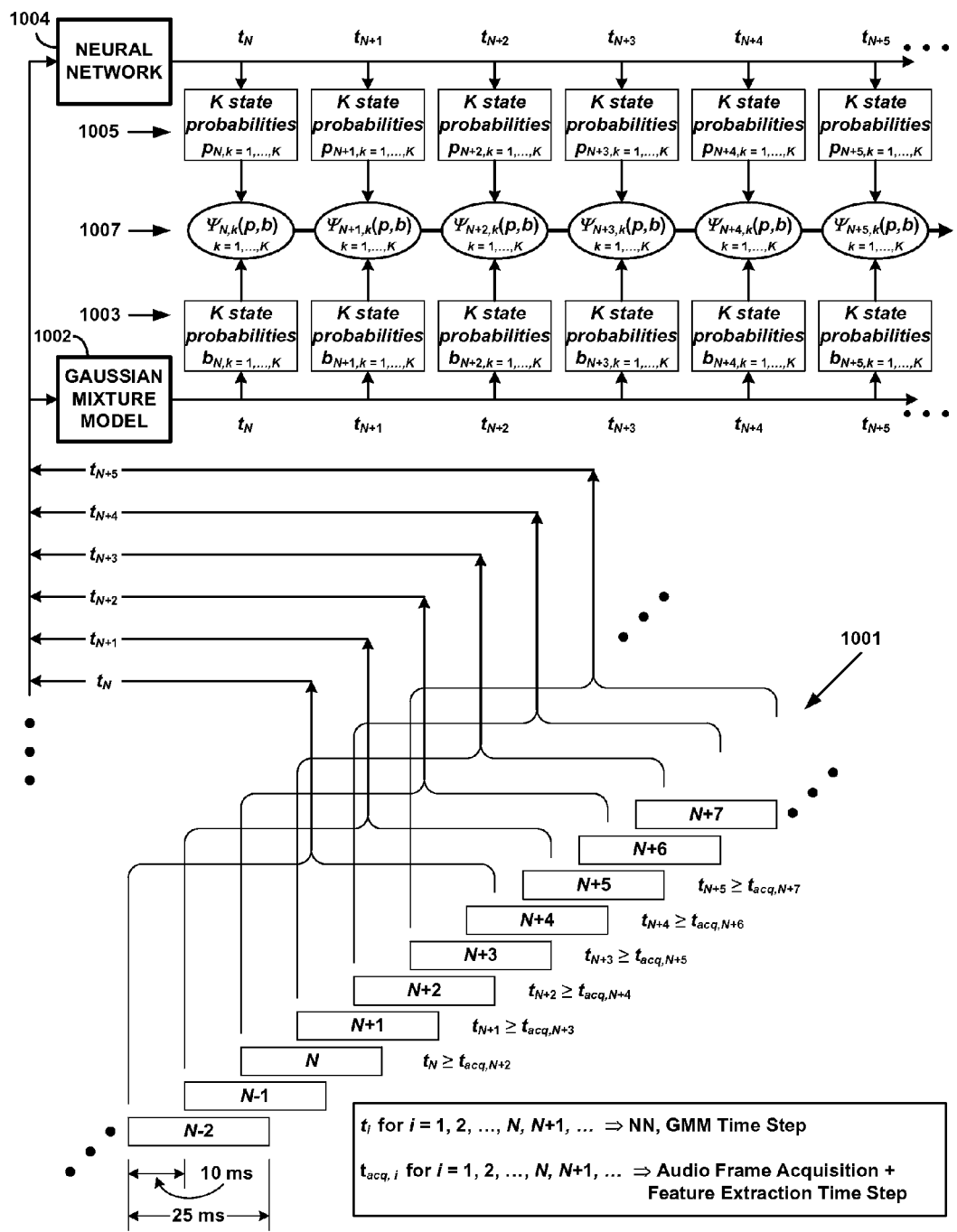
FIG. 10 is a schematic illustration of processing of feature vectors with a neural network and with a Gaussian mixture model, and merging the NN-based emission probabilities with the GMM-based emission probabilities to determine merged emission probabilities for hidden Markov models, in accordance with an example embodiment.

FIG. 10 illustrates an example embodiment of frame-level merging of NN-based and GMM-based conditional probabilities for HMMs. In the figure, a time sequence of feature vectors 1001 is represented again by a "staircase" of overlapping rectangles labeled, by way of example, N−2, N−1, . . . , N, N+1, . . . , N+7, where each label corresponds to a frame time step at which the input audio data was acquired (e.g., digitally sampled). The representation of the feature vectors 1001 is the same as that of feature vectors 601 and 801 in FIGS. 6 and 8, and the previous explanations of feature vectors 601 and 801 apply to feature vectors 1001 as well. For the sake of brevity in FIG. 10, explicit labeling of the input frames and context frames has been omitted.

The single sequence feature vectors 1001 is intended to represent a common frame-level feature extraction for the two sequences referred to above. However, as noted, the specific defining features of each sequence of feature vectors could be different.

The corresponding feature vectors in each stream may be presented as input at the same time step to a GMM 1002 and a NN 1004. As noted, the input feature vector to each of the NN and GMM may be accompanied by different contextual feature vectors (i.e., different numbers of left-context and right-context feature vectors). The GMM 1002 may generate at each time step $t_i$, i=1, 2, . . . , N, N+1, . . . , a set of K emission probabilities $b(x_j|q_k)$ for $q_k$, k=1, . . . , K HMM states. In FIG. 10, for example, a set of K emission probabilities 1003, labeled $b_{N,k=1, \ldots, K}$; $b_{N+1,k=1, \ldots, K}$; $b_{N+2,k=1, \ldots, K}$; $b_{N+3,k=1, \ldots, K}$; $b_{N+4,k=1, \ldots, K}$, and $b_{N+5,k=1, \ldots, K}$ is generated at each of time steps $t_N$, $t_{N+1}$, $t_{N+2}$, $t_{N+3}$, $t_{N+4}$, and $t_{N+5}$. Similarly, the NN 1004 may generate at each time step $t_i$, i=1, 2, . . . , N, N+1, . . . , a set of K emission probabilities $p(x_j|q_k)$ for $q_k$, k=1, . . . , K HMM states. Also by way of example in FIG. 10, a set of K emission probabilities 1005, labeled $p_{N,k=1, \ldots, K}$; $p_{N+2,k=1, \ldots, K}$; $p_{N+3,k=1, \ldots, K}$; $p_{N+4,k=1, \ldots, K}$, and $p_{N+5,k=1, \ldots, K}$ is generated at each of the same time steps $t_N$, $t_{N+1}$, $t_{N+2}$, $t_{N+3}$, $t_{N+4}$, and $t_{N+5}$.

At each time step, a set of weighted emission probabilities 1007 is generated, state-by-state, as weighted sums of the NN-based and the GMM-based conditional probabilities. These are designated $\psi_{N,k}(p,b)$; $\psi_{N+1,k}(p,b)$; $\psi_{N+2,k}(p,b)$; $\psi_{N+3,k}(p,b)$; $\psi_{N+4,k}(p,b)$; $\psi_{N+5,k}(p,b)$; at each of time steps $t_N$, $t_{N+1}$, $t_{N+2}$, $t_{N+3}$, $t_{N+4}$, and $t_{N+5}$. The k-subscript indicates that a separate weighted sum is determined for each of the K states. More particularly, the weighted sums may be expressed as:

$$\psi_{t_i}(k) = w_{NN}(k)p_{t_i}(k) + w_{GMM}(k)b_{t_i}(k), \quad [4]$$

where $\psi_{t_i}(k)$ is the merged probability at time $t_i$ for state k, $w_{NN}(k)$ is a weighting function for NN-based probabilities p for state k, $p_{t_i}(k)$ is the NN-based probability for state k at time $t_i$; $w_{GMM}(k)$ is a weighting function for GMM-based probabilities b for state k, and $b_{t_i}(k)$ is the GMM-based probability for state k at time $t_i$.

The embodiments described herein so far include generating and merging emission probabilities for two approaches, namely NN and GMM. However, the approach can be generalized to encompass more than just the two techniques for determining probabilities, and then merging their respective probabilities. Thus, for M different techniques, indexed m=1, . . . , M, for determining probabilities, a more general form of equation [4] could be expressed as:

$$\Psi_{t_i}(k) = \sum_m w_m(k) p_{t_i}^m(k), \quad [5]$$

where $\Psi_{t_i}(k)$ is the merged probability at time $t_i$ for state k, $w_m(k)$ is a weighting function for the mth technique for determining probabilities p for state k, and $p_{t_i}^m(k)$ is the probability for state k at time $t_i$ as determined by the mth technique. At each time $t_i$, K merged emission probabilities $\Psi_{t_i}(k)$, k=1, . . . , K could thus be determined, and then applied to K HMM states.

Figure 11:
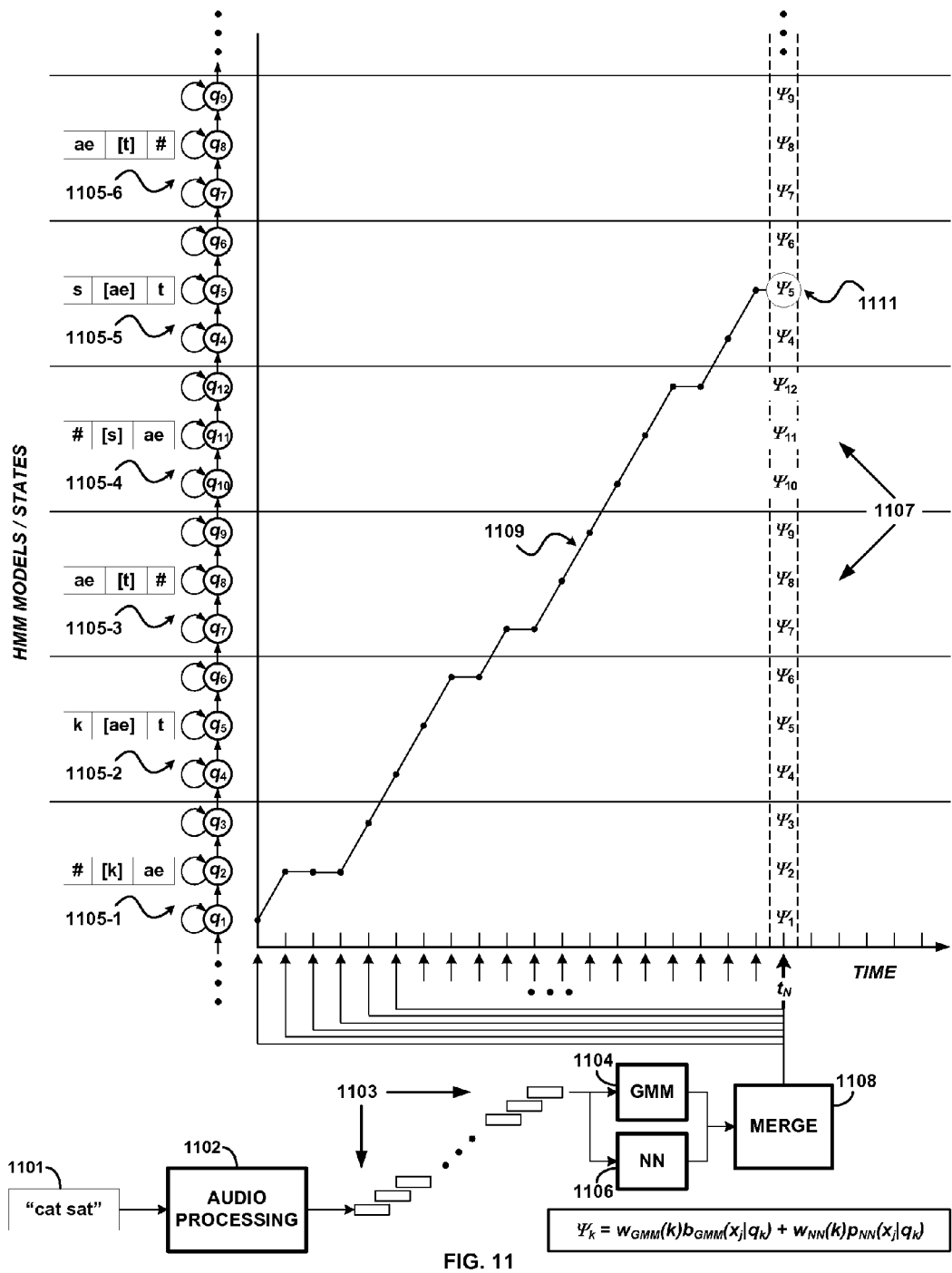
FIG. 11 is a schematic illustration of applying merged emission probabilities determined by a neural network and a Gaussian mixture model to hidden Markov models to determine speech content represented in feature vectors, in accordance with an example embodiment.

Application of the merged emission probabilities to hidden Markov models to determine speech content represented in feature vectors is illustrated schematically in FIG. 11, which may be considered analogous to FIGS. 7 and 9. Again, an example utterance 1101 of "cat sat" is input to an audio processing module 1102, which samples the input in frames and outputs a time sequence of feature vectors 1103. Following the discussion above, the sequence 1103 may be considered as representing two parallel sequences, one for NN processing and the other for GMM processing. This is depicted by the delivery of the feature vectors 1103 as input to both GMM 1104 and NN 1106. The respective output emission probabilities of GMM 1104 and of NN 1106 are then input to a merge module 1108.

The output of the merge module 1108 may be considered the merged stream 1007 shown in FIG. 10. The merged emission probabilities are applied to the K HMM states at each time step $t_i$, as represented by the short vertical arrows at times marked along the horizontal time axis in FIG. 11. Note that the merge module 1108 could be machine-executable instructions for an algorithm for computing weighted sums, such as that expressed in equation [4].

A multiplicity of HMMs 1105-1, 1105-2, 1105-3, 1105-4, 1105-5, and 1105-6 is again represented as a portion of a concatenation of HMM states pictured along the vertical axis in FIG. 11. As in FIGS. 7 and 9, each HMM is used to model a respective triphone, and includes three states corresponding to three acoustic phases of the respective triphone. The format of the HMMs is the same as in FIGS. 7 and 9.

For a merged NN/GMM implementation such as in the present example, the merge module 1108 outputs of K emission probabilities for the states of the HMMs at each time step; i.e. at the frame rate. As with the HNN/HMM and GMM approaches, applying the K emission probabilities to the K HMM states, determines the most probable next state at each time step. By repeating this determination at each time step, a path 1109 through the graph of observed acoustic data versus HMM states is mapped out by connecting successive points in the graph, also at the frame rate. The path 1109 then represents the most likely sequence of HMMs and HMM states, and thereby yields the sequence of triphones in the corpus that most probably corresponds to the input utterance 1101, as represented in the feature vectors 1103. For purposes of illustrating possibly different results yield by the merged approach, the path 1109 is depicted as being slightly different than each of the path 709 and 909.

By way of example in FIG. 11, a set of emission probabilities 1107 is shown as being output from the merge module 1108 at a current neural network time step $t_N$. The emission probabilities 1107 are labeled as $\psi_1, \psi_2, \psi_3, \psi_4, \ldots$, and may be applied to similarly indexed HMM states. Note that $\psi_4, \psi_5,$ and $\psi_6$ are repeated for the HMMs 1105-2 and 1105-5. Similarly, $\psi_7, \psi_8,$ and $\psi_9$ are repeated for the HMMs 1105-3 and 1105-6. As indicated by the circle 1111 enclosing probability $\psi_5$, the HMM state $q_5$ of the HMM 1105-5 is the most probable next state in this example. The immediately preceding state in this example was also $q_5$ of the HMM 1105-5. A legend at the lower right of FIG. 11 defines the merged conditional probabilities generated by the merge module 1108.

In accordance with example embodiments, an ASR system that implements frame-level merging of emission probabilities generated by two or more approaches, such NN-based and GMM-based techniques, can be trained by first training separately for each of the two or more approaches, and then training the frame-level merging of emission probabilities. More particularly, training of the frame-level merging may be achieved by iteratively adjusting the weights (e.g., weighting functions $w_m(k)$ in equation [5]) so as to optimize speech recognition accuracy (or reduce errors or penalty functions to below one or more thresholds). For speech recognition with emission probabilities determined by a neural network, at least some techniques for training may be generally well-known, and are not discussed further herein. Similarly, for speech recognition with emission probabilities determined by a Gaussian mixture model, at least some techniques for training may also be generally well-known, and are also not discussed further herein. The following discussion provides an analytical summary of optimizing the weighting used in frame-level merging, in accordance with example embodiments.

Training can be illustrated by considering the general case of M different techniques for determining emission probabilities, where the weighted sums are given by equation [5]. As a further generalization, the probability $p_{t_i}^m(k)$ may be replaced with a "score" $x_{t_i}^m(k)$ for the state k at time $t_i$. The weighting function $w_m(k)$ may be expressed as a k-element vector $W_m$. Similarly, the score $x_{t_i}^m(k)$ can also be expressed as a k-element vector $x_{t_i}^m$. Then, for time series data corresponding to T time samples of training data, $$\{(x_{t_i}^1, \ldots, x_{t_i}^m), y_{t_i}\},$$

i=1, ..., T, training can be considered as determining $w_m$ with the large margin criteria. More particularly, the classification error can be regularized by the $l_2$ norm. This can be expressed as the optimization problem:

$$\min_{w_m} \frac{1}{T} \sum_{i=1}^{T} \hat{l}(w_m, y_{t_i}) + \frac{\lambda}{2} \|w_m\|^2, \quad [6]$$

where $y_{t_i}$ is the observation at time $t_i$, and $\hat{l}(w_m, y_{t_i})$ represents the loss of prediction made by using $w_m$. The first term in equation [6] corresponds to a training error, and the second term corresponds to a weighted penalty of the model complexity. By way of example, the relation:

$$\hat{l}(w_m, y_{t_i}) = \quad [7]$$

$$l\left(\operatorname{argmax}_k \sum_m w_m(k) x_{t_i}^m(k), y_{t_i}\right) = \begin{cases} 0, & \text{if } \operatorname{argmax}_k \sum_m w_m(k) x_{t_i}^m(k) = y_{t_i} \\ 1, & \text{otherwise} \end{cases}$$

can be used to count the classification error.

The above mathematical descriptions can be used as a framework for an analytical algorithm for optimizing the weights $W_m$. Table 1 below presents a high-level outline of such an algorithm for determining the weights in an iterative fashion.

TABLE 1

Subgradient descent algorithm for learning merging weights

Input: $\{(x_{t_i}^1, \ldots, x_{t_i}^m), y_{t_i}\}$, i = 1, ..., T and a learning rate sequence $\{\eta_t\} = t = 1^T$
$w_0 = 0$
for $t_i$, i = 1, ..., T do
  |Inference with loss augmented objective:
  |$\hat{y}_{t_i} = \operatorname{argmax}_k \Sigma_m w_m(k) x_{t_i}^m(k) + \hat{l}(k, y_{t_i})$;
  |Compute the subgradient: $g_{t_i} = \lambda w_{t_i-1} + f_{t_i}(\hat{y}_{t_i}) - f_{t_i}(y_{t_i})$;
  |Update the weights: $w_{t_i} = w_{t_i-1} - \eta_t g_{t_i}$;

Return: the averaged parameters $\frac{1}{T} \sum_{i=1}^{T} w_{t_i}$

It will be appreciated that the algorithm represented in Table 1, as well as the other various mathematical expressions and formulae described herein, could be implemented in variety of ways as machine-language instructions. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example.

It will be further appreciated that the generalized form of merging of scores of time series data and optimizing weighting described above can be straightforwardly adapted apply to the example embodiments of frame-level merging of NN-based and GMM-based emission probabilities and training, both for training and run-time operation.

Figure 12:
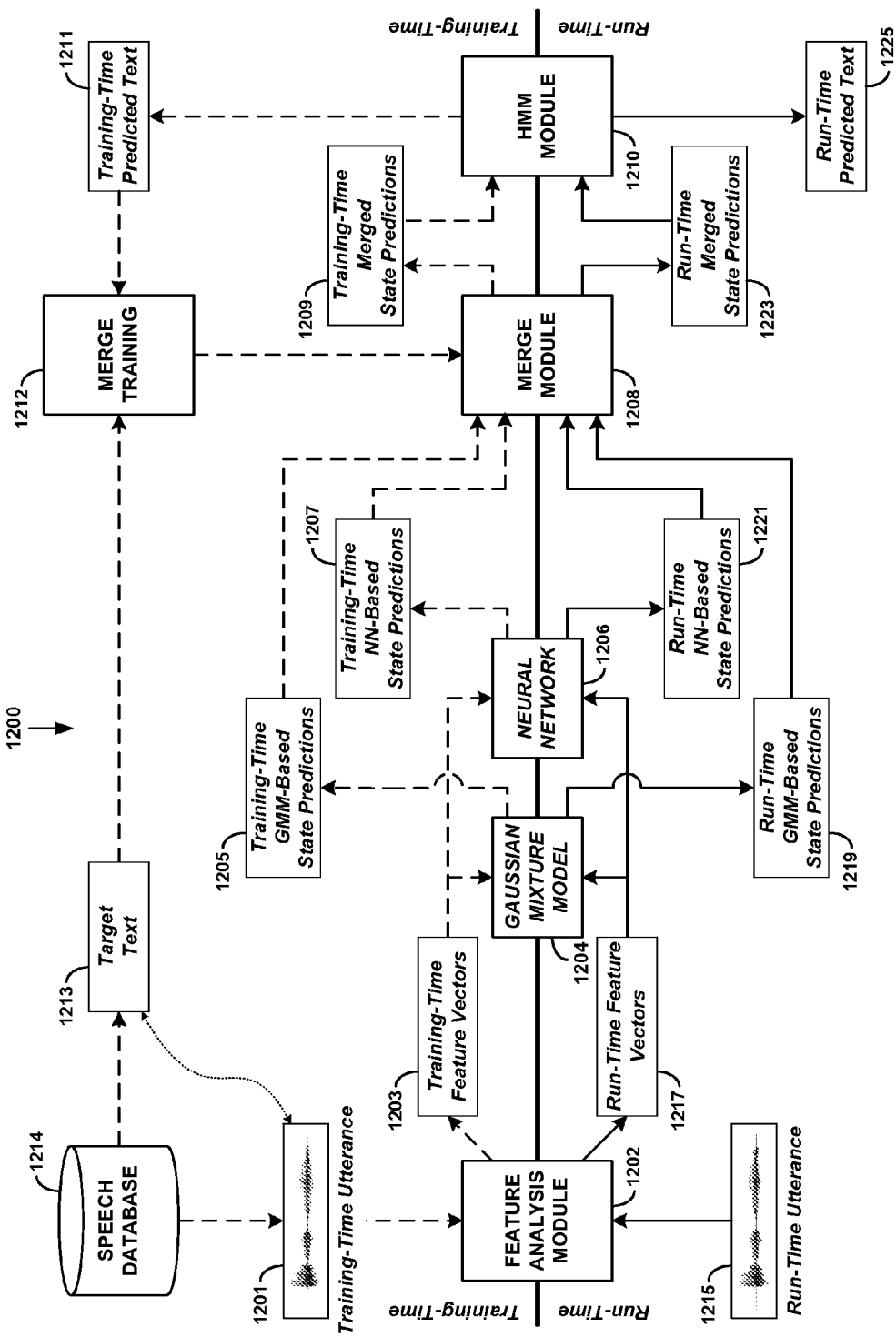
FIG. 12 is a block diagram depicting an example ASR system, and illustrates operational aspects of merged emission probabilities for hidden Markov models, in accordance with an example embodiment.

With the discussion of frame-level merging above as context, the high-level block diagram of an ASR system presented in FIG. 5 can be recast to illustrate certain aspects of such a system more particularly related to frame-level merging. FIG. 12 is a block diagram depicting an example ASR system 1200 that illustrates operational aspects of merged emission probabilities for hidden Markov models, in accordance with an example embodiment. As with FIG. 5, FIG. 12 shows selected example inputs, outputs, and intermediate products of example operation. The functional components of the ASR system 1200 include a feature analysis module 1202, a GMM module 1204, a NN module 1206, a merge module 1208, a HMM module 1210, a merge training module 1212, and a speech database 1214. These functional components could be implemented as machine-language instructions in a centralized and/or distributed fashion on one or more computing platforms or systems, such as those described above. The machine-language instructions could be stored in one or another form of a tangible, non-transitory computer-readable medium (or other article of manufacture), such as magnetic or optical disk, or the like, and made available to processing elements of the system as part of a manufacturing procedure, configuration procedure, and/or execution start-up procedure, for example. Various inputs and outputs are also identified, and discussed below.

The figure is depicted in a way the represents two operational modes: training-time and run-time. A thick, horizontal line marks a conceptual boundary between these two modes, with "Training-Time" labeling a portion of FIG. 12 above the line, and "Run-Time" labeling a portion below the line. For purposes of organizing the present discussion, various arrows in the figure signifying information and/or processing flow and/or transmission are shown as dashed lines in the "Training-Time" portion of the figure, and as solid lines in the "Run-Time" portion.

During training time, a training-time utterance 1201 stored in the speech database 1214 is presented as input to the feature analysis module 1202, which then outputs the sequence 1203 of training-time feature vectors. As discussed above the sequence 1203 could be two parallel sequences that correspond on a frame-by-frame basis to each frame of data in the input training-time utterance 1201. This is depicted conceptually be delivery of the sequence 1203 to each of the GMM module 1204 and the NN module 1206. The GMM module 1204 generates and outputs the training-time GMM-based state predictions 1205 (i.e., conditional probabilities), while the NN module 1206 generates and outputs the training-time NN-based state predictions 1207 (i.e., conditional probabilities). Both the GMM-based state predictions 1205 and the NN-based state predictions 1207 are input to the merge module 1208, which then merges the two sets of state prediction according the description of FIG. 10 or of equation [4], for example.

The output of the merge module 1208 is the training-time merged state predictions 1209. These could correspond to the merged emission probabilities 1007 in FIG. 10 or merged emission probabilities 1107 in FIG. 11, for example. The training-time merged state predictions 1209 are then input to the HMM module 1210, which outputs the training-time predicted text 1211.

The training-time predicted text 1211 is input to the merge training module 1212, which also gets target text 1213 from the speech database 1214. The target text 1213 corresponds to a known textual translation of the training-time utterance 1201, as indicated by the wavey-dashed-line double arrow pointing to each of the target text 1213 and the training-time utterance 1201. That is, the target text 1213 can be consider the "correct" speech-to-text translation of the training-time utterance 1201.

Having both the target text 1213 and the training-time predicted text 1211 as input, merge module 1212 carry out one or another form of parameter adjustment, such as the optimization algorithm illustrated in Table 1, in order to adjust the weights of the frame-level merging so as to achieve best or optimal agreement between the target text 1213 and the training-time predicted text 1211. As noted, this process might be iterative. Moreover, the training procedure represented in FIG. 12 may be carried out repeatedly, over numerous samples of training-time utterances in order to determine what might be considered the best or optimal weights to use in the merging process.

Operation of the ASR system during run time is similar to that during training, except that the merge training is not necessarily carried out. More specifically, a run-time utterance 1215, such as might be supplied by a user or retrieved from a stored audio file, is presented as input to the feature analysis module 1202, which then outputs the sequence 1217 of run-time feature vectors. Again, the sequence 1217 could be two parallel sequences that correspond on a frame-by-frame basis to each frame of data in the input run-time utterance 1215. This is again depicted conceptually be delivery of the sequence 1217 to each of the GMM module 1204 and the NN module 1206. The GMM module 1204 generates and outputs the run-time GMM-based state predictions 1219 (i.e., conditional probabilities), while the NN module 1206 generates and outputs the training-time NN-based state predictions 1221 (i.e., conditional probabilities). Both the GMM-based state predictions 1219 and the NN-based state predictions 1221 are input to the merge module 1208, which then merges the two sets of state prediction according the description of FIG. 10 or of equation [4], for example.

The output of the merge module 1208 is the run-time merged state predictions 1223. These could correspond to the merged emission probabilities 1007 in FIG. 10 or merged emission probabilities 1107 in FIG. 11, for example. The run-time merged state predictions 1223 are then input to the HMM module 1210, which outputs the run-time predicted text 1225. Having been trained to achieve optimum weights for use in the merge module 1208, the HMM module 1210 may yield more accurate run-time predicted text 1225 than might be achieved using either of the GMM-based state predictions 1219 or the NN-based state predictions 1221 individually.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. A method comprising:
    transforming an audio input signal, using one or more processors of a system, into a first sequence of feature vectors and a second sequence of feature vectors, both the first and second sequences of feature vectors corresponding in common to a sequence of temporal frames of the audio input signal, wherein each respective feature vector of the first sequence and a corresponding respective feature vector of the second sequence bear quantitative measures of acoustic properties of a corresponding, respective temporal frame of the sequence of temporal frames of the audio input signal;
    processing the first sequence of feature vectors with a neural network (NN) implemented by the one or more processors of the system to generate a NN-based set of emission probabilities for a plurality of hidden Markov models (HMMs) implemented by the one or more processors of the system;
    processing the second sequence of feature vectors with a Gaussian mixture model (GMM) implemented by the one or more processors of the system to generate a GMM-based set of emission probabilities for the plurality of HMMs;

by computing, for each temporal frame, weighted sums of the NN-based emission probabilities and the GMM-based emission probabilities, merging the NN-based set of emission probabilities with the GMM-based set of emission probabilities to generate a merged set of emission probabilities for the plurality of HMMs; and applying the merged set of emission probabilities to the plurality of HMMs to determine speech content corresponding to the sequence of temporal frames of the audio input signal, wherein the weighted sums are computed according to weights computationally-determined by at least one processor during to a training process that minimizes a computationally-determined difference between computationally-predicted speech in training temporal frames and predetermined speech in the training temporal frames.

2. The method of claim 1, wherein at least two of (i) the NN, (ii) the GMMs, and (iii) the HMMs are implemented by at least one common processor from among the one or more processors of the system.

3. The method of claim 1, wherein the quantitative measures of acoustic properties are at least one of Mel Filter Cepstral coefficients, Perceptual Linear Predictive coefficients, Relative Spectral coefficients, or Filterbank log-energy coefficients.

4. The method of claim 1, wherein the first and second sequences are duplicates of each other.

5. The method of claim 1, wherein the feature vectors of the first sequence bear different quantitative measures of the acoustic properties of the temporal frames of the sequence of temporal frames of the audio input signal than the feature vectors of the second sequence.

6. The method of claim 1, wherein the plurality of HMMs collectively comprise a multiplicity of states, wherein generating the NN-based set of emission probabilities for the plurality of the HMMs comprises: for each respective feature vector of the first sequence, determining, for each respective state of the multiplicity of states, a respective NN-based conditional probability of emitting the respective feature vector of the first sequence given the respective state, and wherein generating the GMM-based set of emission probabilities for the plurality of the GMMs comprises: for each respective feature vector of the second sequence, determining, for each respective state of the multiplicity of states, a respective GMM-based conditional probability of emitting the respective feature vector of the second sequence given the respective state.

7. The method of claim 6, wherein computing, for each temporal frame, the weighted sums of the NN-based emission probabilities and the GMM-based emission probabilities comprises: for each pair of a respective feature vector of the first sequence and a corresponding respective feature vector of the second sequence, determining, for each respective state of the multiplicity, a weighted sum of the respective NN-based conditional probability and the respective GMM-based conditional probability.

8. The method of claim 6, wherein each of the HMMs in the plurality is associated with a respective elemental speech unit, and has one or more states corresponding to one or more temporal phases of the associated, respective elemental speech unit, wherein the multiplicity of states comprises a collection of the one or more states of each of the HMMs in the plurality, and wherein determining the speech content corresponding to the sequence of temporal frames of the audio input signal comprises determining a probable sequence of elemental speech units based on a most likely sequence of states of the multiplicity.

9. The method of claim 8, wherein each elemental speech unit is at least one of a phoneme, a triphone, or a quinphone.

10. The method of claim 1, wherein determining speech content is at least one of generating a text string of the speech content, or identifying a computer-executable command based on the speech content.

11. A method comprising:

transforming an audio input signal, using one or more processors of a system, into a first sequence of feature vectors and a second sequence of feature vectors, both the first and second sequences of feature vectors corresponding in common to a sequence of temporal frames of the audio input signal, wherein each respective feature vector of the first sequence and a corresponding respective feature vector of the second sequence bear quantitative measures of acoustic properties of a corresponding, respective temporal frame of the sequence of temporal frames of the audio input signal;

processing each respective feature vector of the first sequence with a neural network (NN) implemented by the one or more processors of the system to determine, for each respective state of a multiplicity of states of hidden Markov models (HMMs) implemented by the one or more processors of the system, a respective NN-based conditional probability of emitting the respective feature vector of the first sequence given the respective state;

processing each respective feature vector of the second sequence with a Gaussian mixture model (GMM) implemented by the one or more processors of the system to determine, for each respective state of the multiplicity of states, a respective GMM-based conditional probability of emitting the respective feature vector of the second sequence given the respective state;

for each pair of a respective feature vector of the first sequence and a corresponding respective feature vector of the second sequence, determining, for each respective state of the multiplicity of states, a respective weighted sum of the respective NN-based conditional probability and the respective GMM-based conditional probability, each respective weighted sum being one of a set of weighted-sum emission probabilities for the multiplicity of states; and computationally determining, by at least one processor, weights of the set of weighted-sum emission probabilities in order to reduce a difference computed by the at least one processor between (i) predicted speech content of the sequence of temporal frames computationally determined by the at least one processor by applying the set of weighted-sum emission probabilities to the multiplicity of states and (ii) pre-determined speech content of the sequence of temporal frames.

12. A system comprising:
one or more processors;
memory; and
machine-readable instructions stored in the memory, that upon execution by the one or more processors cause the system to carry out operations comprising:

transforming an audio input signal into a first sequence of feature vectors and a second sequence of feature vectors, wherein both the first and second sequences of feature vectors correspond in common to a sequence of temporal frames of the audio input signal, and wherein each respective feature vector of the first sequence and a corresponding respective feature vector of the second sequence bear quantitative measures of acoustic properties of a corresponding, respective temporal frame of the sequence of temporal frames of the audio input signal, processing the first sequence of feature vectors with a neural network (NN) implemented by the system to generate a NN-based set of emission probabilities for a plurality of hidden Markov models (HMMs) implemented by the system, processing the second sequence of feature vectors with a Gaussian mixture model (GMM) implemented by the system to generate a GMM-based set of emission probabilities for the plurality of HMMs, by computing, for each temporal frame, weighted sums of the NN-based emission probabilities and the GMM-based emission probabilities, merging the NN-based set of emission probabilities with the GMM-based set of emission probabilities to generate a merged set of emission probabilities for the plurality of HMMs, and applying the merged set of emission probabilities to the plurality of HMMs to determine speech content corresponding to the sequence of temporal frames of the audio input signal, wherein the weighted sums are computed according to weights computationally-determined by at least one processor during to a training process that minimizes a computationally-determined difference between computationally-predicted speech in training temporal frames and predetermined speech in the training temporal frames.

13. The system of claim 12, wherein the quantitative measures of acoustic properties are at least one of Mel Filter Cepstral coefficients, Perceptual Linear Predictive coefficients, Relative Spectral coefficients, or Filterbank log-energy coefficients.

14. The system of claim 12, wherein the plurality of HMMs collectively comprise a multiplicity of states, wherein generating the NN-based set of emission probabilities for the plurality of the HMMs comprises: for each respective feature vector of the first sequence, determining, for each respective state of the multiplicity of states, a respective NN-based conditional probability of emitting the respective feature vector of the first sequence given the respective state, wherein generating the GMM-based set of emission probabilities for the plurality of the GMMs comprises: for each respective feature vector of the second sequence, determining, for each respective state of the multiplicity of states, a respective GMM-based conditional probability of emitting the respective feature vector of the second sequence given the respective state, and wherein computing, for each temporal frame, the weighted sums of the NN-based emission probabilities and the GMM-based emission probabilities comprises: for each pair of a respective feature vector of the first sequence and a corresponding respective feature vector of the second sequence, determining, for each respective state of the multiplicity, a weighted sum of the respective NN-based conditional probability and the respective GMM-based conditional probability.

15. The system of claim 12, wherein each of the HMMs in the plurality is associated with a respective elemental speech unit, and has one or more states corresponding to one or more temporal phases of the associated, respective elemental speech unit, wherein the multiplicity of states comprises a collection of the one or more states of each of the HMMs in the plurality, and wherein determining the speech content corresponding to the sequence of temporal frames of the audio input signal comprises determining a probable sequence of elemental speech units based on a most likely sequence of states of the multiplicity.

16. The system of claim 12, wherein determining speech content is at least one of generating a text string of the speech content, or identifying a computer-executable command based on the speech content.

17. A tangible, non-transitory computer-readable storage medium, having stored thereon program instructions that, upon execution by one or more processors of a system, cause the system to perform operations comprising:

transforming an audio input signal into a first sequence of feature vectors and a second sequence of feature vectors, wherein both the first and second sequences of feature vectors correspond in common to a sequence of temporal frames of the audio input signal, and wherein each respective feature vector of the first sequence and a corresponding respective feature vector of the second sequence bear quantitative measures of acoustic properties of a corresponding, respective temporal frame of the sequence of temporal frames of the audio input signal;

processing the first sequence of feature vectors with a neural network (NN) implemented by the system to generate a NN-based set of emission probabilities for a plurality of hidden Markov models (HMMs) implemented by the system;

processing the second sequence of feature vectors with a Gaussian mixture model (GMM) implemented by the system to generate a GMM-based set of emission probabilities for the plurality of HMMs by computing, for each temporal frame, weighted sums of the NN-based emission probabilities and the GMM-based emission probabilities, merging the NN-based set of emission probabilities with the GMM-based set of emission probabilities to generate a merged set of emission probabilities for the plurality of HMMs; and applying the merged set of emission probabilities to the plurality of HMMs to determine speech content corresponding to the sequence of temporal frames of the audio input signal, wherein the weighted sums are computed according to weights computationally-determined by at least one processor during to a training process that minimizes a computationally-determined difference between computationally-predicted speech in training temporal frames and predetermined speech in the training temporal frames.

18. The tangible, non-transitory computer-readable storage medium of claim 17, wherein the quantitative measures of acoustic properties are at least one of Mel Filter Cepstral coefficients, Perceptual Linear Predictive coefficients, Relative Spectral coefficients, or Filterbank log-energy coefficients.

19. The tangible, non-transitory computer-readable storage medium of claim 17, wherein the plurality of HMMs collectively comprise a multiplicity of states, wherein generating the NN-based set of emission probabilities for the plurality of the HMMs comprises: for each respective feature vector of the first sequence, determining, for each respective state of the multiplicity of states, a respective NN-based conditional probability of emitting the respective feature vector of the first sequence given the respective state, wherein generating the GMM-based set of emission probabilities for the plurality of the GMMs comprises: for each respective feature vector of the second sequence, determining, for each respective state of the multiplicity of states, a respective GMM-based conditional probability of emitting the respective feature vector of the second sequence given the respective state, and wherein computing, for each temporal frame, the weighted sums of the NN-based emission probabilities and the GMM-based emission probabilities comprises: for each pair of a respective feature vector of the first sequence and a corresponding respective feature vector of the second sequence, determining, for each respective state of the multiplicity, a weighted sum of the respective NN-based conditional probability and the respective GMM-based conditional probability.

20. The tangible, non-transitory computer-readable storage medium of claim 17, wherein each of the HMMs in the plurality is associated with a respective elemental speech unit, and has one or more states corresponding to one or more temporal phases of the associated, respective elemental speech unit, wherein the multiplicity of states comprises a collection of the one or more states of each of the HMMs in the plurality, and wherein determining the speech content corresponding to the sequence of temporal frames of the audio input signal comprises determining a probable sequence of elemental speech units based on a most likely sequence of states of the multiplicity.

21. The tangible, non-transitory computer-readable storage medium of claim 20, wherein each elemental speech unit is at least one of a phoneme, a triphone, or a quinphone.

22. The tangible, non-transitory computer-readable storage medium of claim 17, wherein determining speech content is at least one of generating a text string of the speech content, or identifying a computer-executable command based on the speech content.

23. A tangible, non-transitory computer-readable storage medium, having stored thereon program instructions that, upon execution by one or more processors of a system, cause the system to perform operations comprising:

transforming an audio input signal into a first sequence of feature vectors and a second sequence of feature vectors, wherein both the first and second sequences of feature vectors correspond in common to a sequence of temporal frames of the audio input signal, and wherein each respective feature vector of the first sequence and a corresponding respective feature vector of the second sequence bear quantitative measures of acoustic properties of a corresponding, respective temporal frame of the sequence of temporal frames of the audio input signal;

processing each respective feature vector of the first sequence with a neural network (NN) implemented by the system to determine, for each respective state of a multiplicity of states of hidden Markov models (HMMs) implemented by the system, a respective NN-based conditional probability of emitting the respective feature vector of the first sequence given the respective state;

processing each respective feature vector of the second sequence with a Gaussian mixture model (GMM) implemented by the system to determine, for each respective state of the multiplicity of states, a respective GMM-based conditional probability of emitting the respective feature vector of the second sequence given the respective state;

for each pair of a respective feature vector of the first sequence and a corresponding respective feature vector of the second sequence, determining, for each respective state of the multiplicity of states, a respective weighted sum of the respective NN-based conditional probability and the respective GMM-based conditional probability, each respective weighted sum being one of a set of weighted-sum emission probabilities for the multiplicity of states; and computationally determining weights of the set of weighted-sum emission probabilities in order to reduce a difference computed by the at least one processor between (i) predicted speech content of the sequence of temporal frames computationally determined by the at least one processor by applying the set of weighted-sum emission probabilities to the multiplicity of states and (ii) pre-determined speech content of the sequence of temporal frames.

* * * * *